(12) United States Patent
Yoshino

(10) Patent No.: US 11,496,082 B2
(45) Date of Patent: Nov. 8, 2022

(54) SYNCHRONOUS MOTOR DRIVE SYSTEM AND SYNCHRONOUS MOTOR DRIVE METHOD

(71) Applicant: SYSTEM HOMES COMPANY, LTD., Tokyo (JP)

(72) Inventor: Hozo Yoshino, Tokyo (JP)

(73) Assignee: SYSTEM HOMES COMPANY, LTD., Tokyo (JP)

( * ) Notice: Subject to any disclaimer, the term of this patent is extended or adjusted under 35 U.S.C. 154(b) by 0 days.

(21) Appl. No.: 17/366,288

(22) Filed: Jul. 2, 2021

(65) Prior Publication Data

US 2021/0336573 A1  Oct. 28, 2021

Related U.S. Application Data

(60) Division of application No. 16/857,023, filed on Apr. 23, 2020, now Pat. No. 11,056,995, which is a
(Continued)

(51) Int. Cl.
*H02P 23/30* (2016.01)
*H02P 23/26* (2016.01)
(Continued)

(52) U.S. Cl.
CPC .............. *H02P 23/30* (2016.02); *H02P 23/26* (2016.02); *H02P 27/047* (2013.01); *H02P 27/085* (2013.01); *H02P 2201/15* (2013.01)

(58) Field of Classification Search
CPC ........ H02P 23/30; H02P 23/26; H02P 27/047; H02P 27/085; H02P 2201/15
(Continued)

(56) References Cited

U.S. PATENT DOCUMENTS 4,409,534 A    10/1983 Bose
4,634,952 A    1/1987 Yoshino et al.
(Continued)

FOREIGN PATENT DOCUMENTS

JP    56010090 A    2/1981
JP    57206300 A    12/1982
(Continued)

OTHER PUBLICATIONS

U.S. Appl. No. 12/145,306, Notice of Allowance, 7 pages, dated Oct. 8, 2018.
(Continued)

*Primary Examiner* — Kawing Chan
(74) *Attorney, Agent, or Firm* — Dorsey & Whitney LLP

(57) ABSTRACT

The present disclosure is constructed on the prior art inverter architecture, a pulse code width modulation (PCWM). This is an open loop motor control system without sensing its rotor position. The present disclosure employs a closed loop method to track the optimum efficiency motor operating point directly. A bench load test is conducted to gather information for an AI type control, which includes both load angle vs. voltage command charts and power factor vs. voltage command charts, with load levels as parameters for certain frequency command ranges. This way, the optimum efficiency motor operating points are generated a priori. The AI type control is mechanized to track the optimum efficiency motor operating points.

9 Claims, 30 Drawing Sheets

Related U.S. Application Data continuation of application No. PCT/JP2018/040202, filed on Oct. 29, 2018.

(60) Provisional application No. 62/577,837, filed on Oct. 27, 2017.

(51) Int. Cl.
*H02P 27/04* (2016.01)
*H02P 27/08* (2006.01)

(58) Field of Classification Search
USPC .................................................. 318/400.15
See application file for complete search history.

(56) References Cited

U.S. PATENT DOCUMENTS

| | | | | |
|---|---|---|---|---|
| 4,740,738 | A | * | 4/1988 | El-Antably ............ H02P 3/065 318/723 |
| 5,420,778 | A | | 5/1995 | Yoshino |
| 7,456,600 | B1 | | 11/2008 | Yoshino |
| 2006/0061923 | A1 | | 3/2006 | Wang et al. |
| 2007/0230648 | A1 | | 10/2007 | Gupta et al. |

FOREIGN PATENT DOCUMENTS

| | | | |
|---|---|---|---|
| JP | 60074996 | A | 4/1985 |
| JP | 62236380 | A | 10/1987 |
| JP | 63220795 | A | 9/1988 |
| JP | 3056093 | A | 3/1991 |
| JP | 3164095 | A | 7/1991 |
| JP | 7023593 | A | 1/1995 |
| JP | 8331893 | A | 12/1996 |
| JP | H10341587 | A | 12/1998 |
| JP | 11018436 | A | 1/1999 |
| JP | 2006109688 | A | 4/2006 |
| JP | 2007116768 | A | 5/2007 |
| JP | 2007295647 | A | 11/2007 |
| JP | 2008131782 | A | 6/2008 |
| JP | 4482644 | B2 | 6/2010 |
| JP | 2017123744 | A * | 7/2017 |
| WO | 2011129297 | A1 | 10/2011 |
| WO | 2019083050 | A1 | 5/2019 |

OTHER PUBLICATIONS

U.S. Appl. No. 16/857,023, Non-Final Office Action, 11 pages, dated Sep. 17, 2020.
U.S. Appl. No. 16/857,023, Notice of Allowance, 7 pages, dated Mar. 8, 2021.
PCT/JP2018/040202, International Search Report and Written Opinion, 14 pages, dated Jan. 22, 2019.

* cited by examiner

Unit Sine Function Table

| Table Position | Unit Sine Function | Unit Sine Function Decimal Numbers* | Unit Sine Function Numerics (Hexadecimal Numbers) |
|---|---|---|---|
| n=1 | 127sin (0.250) | 0.55414 | h01 |
| n=2 | 127sin (0.250+0.50) | 1.66238 | h02 |
| n=3 | 127sin (0.250+1.00) | 2.77049 | h03 |
| n=4 | 127sin (0.250+1.50) | 3.87839 | h04 |
| n=180 | 127sin (0.250+89.50) | 126.99879 | h7f |
| n=181 | 127sin (0.250+90.00) | 126.99879 | h7f |
| n=360 | 127sin (0.250+179.50) | 0.55414 | h01 |
| n=361 | 127sin (0.250+180.00) | -0.55414 | hfe |
| n=539 | 127sin (0.250+269.50) | -126.99879 | h80 |
| n=540 | 127sin (0.250+270.00) | -126.99879 | h80 |
| n=717 | 127sin (0.250+358.00) | -3.87839 | hfb |
| n=718 | 127sin (0.250+358.50) | -2.77049 | hfc |
| n=719 | 127sin (0.250+359.00) | -1.66238 | hfd |
| n=720 | 127sin (0.250+359.50) | -0.55414 | hfe |

*Negative decimal numbers (n=361-720) are converted to the hexadecimal integers in one's complements.

FIG.3

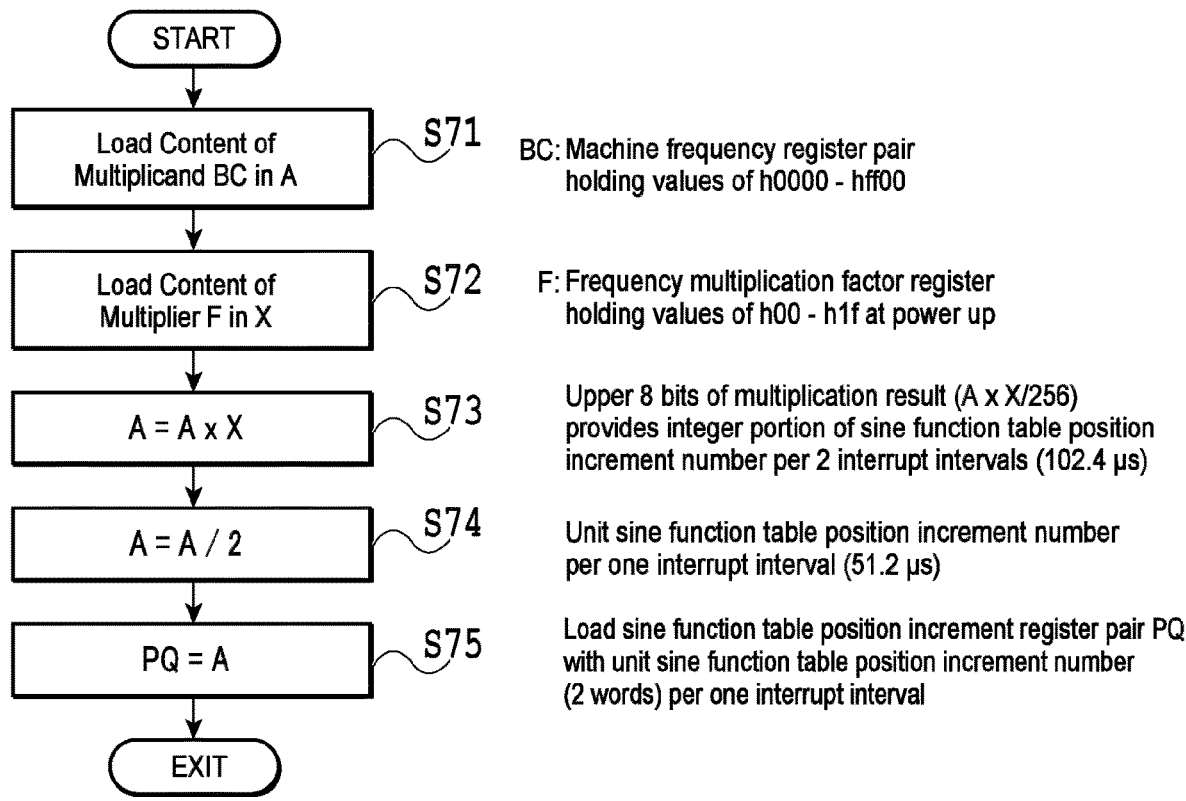
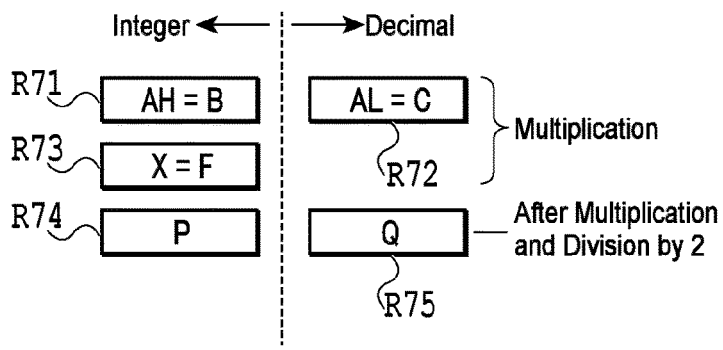
FIG.7

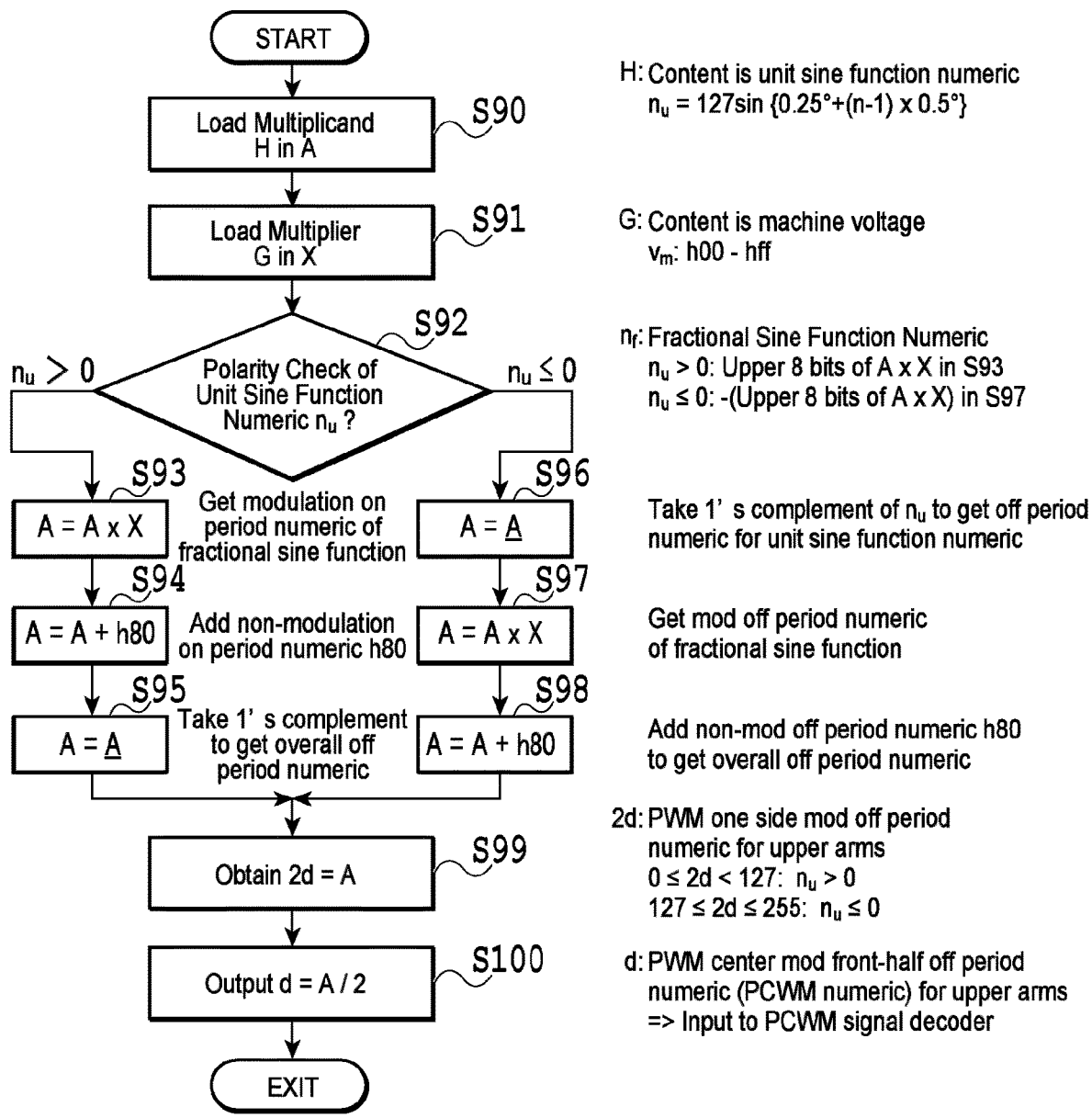
FIG.9
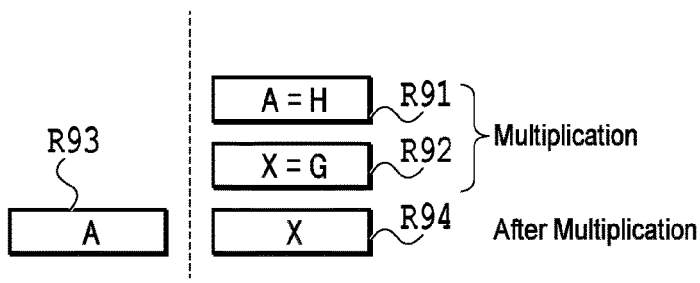

| Item | Vector Control | Torque Control |
|---|---|---|
| Origin of Controlled Motor | Direct Current Motor | Induction Motor |
| Control Coordinate System | Rotating Coordinate | Stationary Coordinate |
| Primary Control Axis | Rotating Permanent Magnet Axis | Stationary Electromagnet Axis |
| Coordinate Transformation | Necessary | Not Necessary |
| Number of Control Axes | 2 axes | 1 axis |
| Control Variable | Current | Voltage |
| Load Angle Index | No Use | Primary Index |
| PWM Modulation | Signal & Carrier Comparison Method | Pulse Code Width Modulation (PCWM) |
| Output Waveform | Digitized Sinusoidal Wave | Digitized Sinusoidal Wave |
| Current Sensor | Necessary | Not Necessary |
| A/D Converter | Necessary | Not Necessary |
| Power Transistors | Single IGBT x 6 | Single MOSFET x 6 |
| Gate Drive | Opt Couplers | MOSFETs / Complimentary Transistors |
| Power Supply Type | Switching Transformer | Stepdown Chopper |
| Small Dielectric Capacitors | Vertical Mounting Type | No Use |

FIG.16

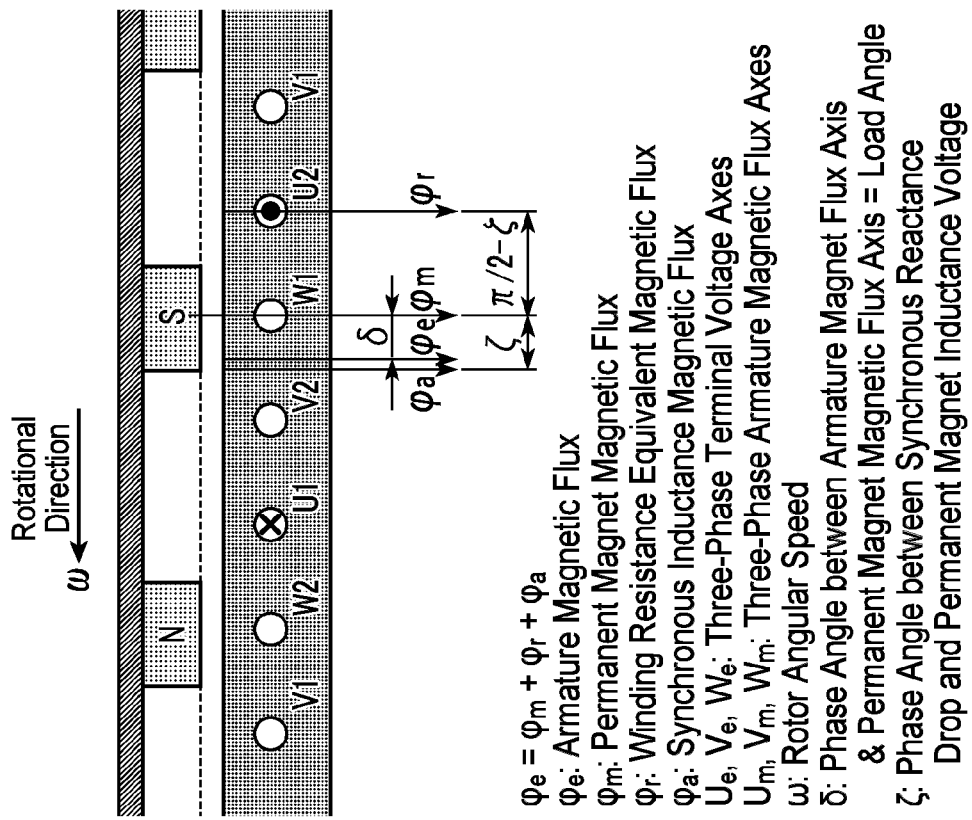
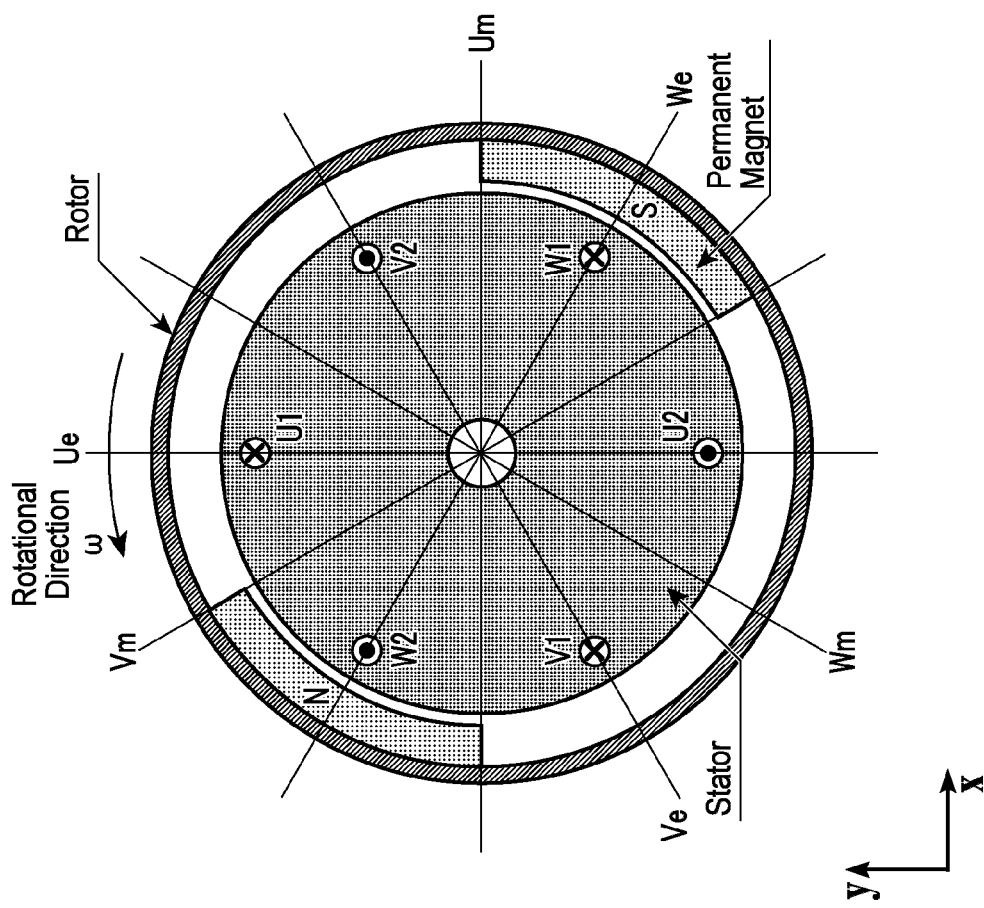
FIG. 18

SYNCHRONOUS MOTOR DRIVE SYSTEM AND SYNCHRONOUS MOTOR DRIVE METHOD

RELATED APPLICATIONS

This application is a divisional of U.S. patent application Ser. No. 16/857,023, filed Apr. 23, 2020, which is a continuation of PCT/JP2018/040202, filed Oct. 29, 2018, which claims the benefit of U.S. Provisional Patent Application No. 62/577,837 filed Oct. 27, 2017, each of which is hereby incorporated by reference herein in its entirety.

TECHNICAL FIELD

The present disclosure relates to a drive system and a drive method for a synchronous motor (e.g. a permanent magnet motor).

BACKGROUND

Induction motors have structures in which rotors do not have permanent magnets, and are simple but inefficient. There are two classes of motor loads: stationary load use such as compressors, pumps and fans, and non-stationary load use such as servo motors. Volume-wise, induction motors are dominantly employed for the stationary load use.

Vector control inverters were developed for permanent magnet motors, but do not have functions to directly track the highest efficiency.

An inverter control operating system: Pulse Code Width Modulation (PCWM) scheme described in our prior patent, Japanese Patent No. 4482644 entitled "Pulse Code Width Modulation Motor Drive System" (Patent Document 1) is one which an open loop drives a three phase permanent magnet AC (PMAC) motor by a sinusoidal wave signal without detecting the rotor position. In the following, the invention of Japanese Patent No. 4482644 is referred to as "prior patent invention."

The prior patent invention has been made to open loop control PMAC motors for applications such as fans and compressors. The load level of these applications is typically known in advance. Therefore, in one embodiment of the prior patent invention, in order to simplify the system, the V/F function is defined as a fixed function of the motor speed.

One feature of one embodiment of the prior patent invention is a real time calculation capability of updating an output sine function phase angle and the associated pulse output width of the PWM signal every constant carrier signal interval of 51.2 μs (=0.2×256 μs, in which 0.2 μs is the basic clock interval and 256 is the number of encoding pulses within the PWM modulation interval.) through use of finite state machine technology. This feature enables on/off modulation of the power transistor by a sinusoidal wave signal using an ultrasonic carrier frequency of approximately 20 kHz (=1/51.2 μs) to reduce annoying acoustic noise peculiar to digital control. This concept is realized by drawing a fractional sine function circle which is located inside the unit sine function circle which represents the maximum output voltage, and corresponds to the intermediate output voltage. This clearly defines the relationship between an instantaneous amplitude value of the fractional sine function and a pulse width numeric in a unit PWM pulse interval for the motor drive signal output. In the following, the real time calculation procedure of the PWM signal using a unit sine function table and a V/F function table will be described in detail for one embodiment of the prior patent invention.

Another feature of one embodiment of the prior patent invention is a calculation capability of performing calculation of both integers and decimals by using double precision registers, in which carry/borrow of the result by rounding off. This allows more precise digital speed control and increased motor drive stability.

Yet another feature of one embodiment of the prior patent invention is a capability of setting the maximum output frequency and acceleration-deceleration constant from outside through a single serial communication line. This capability widens the applicability of a single ASIC (Application Specific IC) chip to various motor drive applications.

Still another feature of one embodiment of the prior patent invention is employment of a center modulation PWM signal. In a general one side modulation PWM signal, the inter-conduction between the upper arm and the lower arm of the power transistor occurs once per unit PWM pulse interval, whereas it occurs twice in the center modulation PWM signal. As a result, the ripple frequency of the current waveform of digital control becomes twice for the center modulation PWM signal compared to once for one side modulation PWM signal. Therefore, the current waveform becomes finer, and the motor can be driven more smoothly.

A still another feature of one embodiment of the prior patent invention is compactness of the used hardware. In particular, the ASIC can employ a small outline package (SOP) to incorporate all of the unit sine function table, the V/F function table, a clock generator, a PCWM signal encoder, and a PCWM signal decoder in one small package.

In the following, a detailed architectural and operational characteristic of a PCWM motor drive system of the prior patent invention will be explained. This motor drive system is characterized in that a three phase PMAC motor is open loop controlled by a sinusoidal wave signal without detecting its rotor position. The present system is a very high cost performance motor drive system which employs an ultrasonic carrier frequency of approximately 20 kHz to reduce acoustic noise, and can satisfy motor operating requirements of various uses by only a single ASIC while keeping the hardware construction minimum.

A configuration of one embodiment of the prior patent invention will be explained by referring to FIG. 1. An external host CPU 01 is connected to an ASIC 06 via a UART serial bus 02. A single phase AC commercial power supply input 03 is connected to an AC to DC converter 04, and its AC input is converted to a DC bus voltage 05 of approximately 150 VDC or to approximately 300 VDC which is dependent on the system specification. The ASIC 06 with the input from the UART serial bus 02 performs real time arithmetic operations and outputs gate drive input signals 07 to a gate drive and power transistor circuitry 08. The gate drive and power transistor circuitry 08 then outputs three sinusoidal wave motor drive signals 09 to drive a three phase AC motor 10. The DC bus voltage 05 is provided to a DC to DC step-down chopper 11 and the gate drive and power transistor circuitry 08. The DC to DC step-down chopper 11 further provides 3.3 VDC as a power supply 12 to the ASIC 06 and 5 VDC and 15 VDC as power supplies 13 and 14 for control of the gate drive and power transistor circuitry 08.

FIG. 2 is a block diagram showing the inside configuration of the ASIC 06 and the gate drive and power transistor circuitry 08 according to one embodiment of the prior patent invention. The ASIC 06 receives its input signal via the UART serial bus 02. An acceleration-deceleration constant kad of 2 bit hexadecimal number and a frequency multiplication factor kfmf of 5 bit hexadecimal number are input to the ASIC 06 immediately after the power up. After the start of the motor, a command frequency fc of 8 bit hexadecimal number is input to the ASIC 06 as an alternate input.

A clock generator 21, which is not shown here, operates on a crystal oscillator having a baseline frequency of 10 MHz which is connected to the outside of the ASIC 06, and provides clock pulses of different frequencies or phases to blocks in the ASIC 06. Both a clock CK1 28 with the repetition period of 200 ns and a clock CK3 29 with the repetition period of 51.2 µs are provided as clock signals to the PCWM signal encoder 25 and the PCWM signal decoder 27. Similarly, the clock CK4 30 with the repetition period of 51.2 µs is provided as a clock signal to the PCWM signal decoder 27. Further, a clock CK5 31 with the repetition period of approximately 3.6864 ms is provided as a clock signal to the PCWM signal encoder 25.

A unit sine function table 22 used in one embodiment of the prior patent invention comprises values of 8 bit hexadecimal numbers corresponding to sine function values of the maximum amplitude (127 sin θ) between 0°-360°. However, negative numbers are represented by one's complements. When a unit sine function table position n of the unit sine function table 22 is input from the PCWM signal encoder 25, a unit sine function numeric nu 24 is sent back to the PCWM signal encoder 25. When a machine frequency fm of 8 bit hexadecimal number is input from the PCWM signal encoder 25, a V/F function table 23 sends a machine voltage vm of 8 bit hexadecimal number back to the PCWM signal encoder 25.

The PCWM signal encoder 25 is the finite state machine which is operational on the clock CK1 28. The PCWM signal encoder 25 updates the machine frequency fm and machine voltage vm every interrupt period of the clock CK5 31 by inputting the acceleration-deceleration constant kad and the frequency multiplication factor kfmf at the power up and the command frequency fc after the start of the motor via the UART serial bus 02. Further, it updates the unit sine function numeric nu 24 every interrupt period of the clock CK3 29 based on the updated machine frequency fm and machine voltage vm and the frequency multiplication factor kfmf to calculate the PCWM numerics d 26 and output them to the PCWM signal decoder 27.

The PCWM signal decoder 27 operates on the clock CK1 28 and comprises a D flip-flop 32, a 7-bit up-converter 34, and a toggle flip-flop 36 which are serially connected (see FIG. 12). The PCWM signal decoder 27 inputs the PCWM numerics d 26 output from the PCWM signal encoder 25 every interrupt period of the clock CK3 29, and outputs center modulation PWM signal numerics g 07 to the gate drive and power transistor circuitry 08.

The gate drive and power transistor circuitry 08 comprises U phase upper arm 15 and lower arm 16, V phase upper arm 17 and lower arm 18, and W phase upper arm 19 and lower arm 20, each connected in tandem for each pair of three phases. The DC bus voltage 05 is on/off modulated by the center modulation PWM signals g 07 output from the PCWM signal decoder 27, thereby the power transistors of the upper arms and the lower arms are activated. The three sinusoidal wave motor drive signals 09 are generated which correspond to the U, V and W phases, and applied to the three phase AC motor 10.

FIG. 3 is the unit sine function table 22 used in one embodiment of the prior patent invention which is referred to by FIG. 2. The PCWM signal encoder 25 refers to this table for obtaining a unit sine function numeric nu 24 of 8 bit hexadecimal number, by inputting the unit sine function table position n of 8 bit hexadecimal number.

FIG. 4 illustrates a relationship between the fractional sine function numeric nf and the pulse width numeric pw in the unit PWM pulse interval. The fractional sine function numeric nf represents the instantaneous amplitude value and the pulse width numeric pw takes 255 discrete positions. The unit sine function circle represents a circle with the maximum radius of 127 corresponding to the maximum amplitude employed in one embodiment of the prior patent invention. From the center of this circle, 720 radial line segments extend in the circumferential direction at 0.5 degree intervals, and each radial line segment represents 720 different phase angles of the unit sine function. On and inside this unit sine function circle, there are 255 circles with radiuses equal to or smaller than 255 and each circle represents 255 different motor output voltage levels. Mathematically, therefore, there are 720×255 cross points representing combinations of phases and voltages of the sinusoidal wave signal which can be taken by this digital machine.

Output frequency of the three sinusoidal wave motor drive signals 09 is proportional to the scanning speed of the unit sine function table 22, which is equivalent to the scanning speed of the rotating circle and is determined by the product of the machine frequency fm and the frequency multiplication factor kfmf. Output voltage of the three phase sinusoidal wave motor drive signals 09 is proportional to the radius of the fractional sine function which is on or inside the unit sine function circle. When the three phase AC motor 10 starts to rotate after the start of the motor, it originates with the rotating circle near the center of the fractional sine function circle group, and the scanning speed of the rotating circle at this time is slow in proportion to the minimum rotation speed of the motor. Then this rotating circle gradually moves to the outer trajectory with an accelerating speed. Finally, when the three phase AC motor 10 gets to the maximum speed, the rotating circle reaches the outermost unit sine function circle corresponding to the maximum voltage, and rotates at the scanning speed corresponding to the maximum rotational speed of the motor.

FIG. 5 is a graph showing a relationship between the pulse width numeric pw in the unit PWM pulse interval of 51.2 µs and the instantaneous amplitude value of the fractional sine function numeric nf according to one embodiment of the prior patent invention. This relationship shows that only integers are employed in digital machine calculations. By this exact numerical relation, the instantaneous amplitude of fractional sine function numeric nf can be translated into the pulse width numeric pw in real time every CK3 29 interrupt clock period of 51.2 µs.

FIG. 6 is a flow chart of a subprogram showing the one embodiment of the prior PCWM signal encoder 25. The machine frequency fm and the machine voltage vm are updated every CK5 31 interrupt period (approximately 3.6864 ms) in S62, S66, and S68 in the PCWM signal encoder 25. The acceleration-deceleration constant kad and the frequency multiplication factor kfmf in S61 are input to the PCWM signal encoder 25 via the UART serial bus 02 at the power up and stored in a frequency increment register pair D R63 and E R64 where D R63 stores null and E R64 stores an actual constant, and in a frequency multiplication factor register F R65, respectively.

The acceleration-deceleration constant kad can be selected outside the motor drive system of one embodiment of the prior patent invention in order to conform to the acceleration-deceleration specifications of motors for various applications. There are four ramp speed options for the acceleration-deceleration. The frequency multiplication factor kfmf can also be selected externally in order to conform to the maximum drive output frequency specifications of motors for various applications. There are 31 options to select for the gate drive and power transistor circuitry 08.

S62 shows that this subprogram is entered every CK5 31 interrupt period to check if the command frequency fc which is input via the UART serial bus 02 after the power up is equal to the machine frequency fm in S63. If the command frequency fc is equal to the machine frequency fm, the subprogram goes to the exit. Otherwise, an addition and subtraction routine in S64 is entered where machine frequency register pair B R61 and C R62 are used along with the frequency increment register pair D R63 and E R64 for the machine frequency fm update. Both the frequency increment register pair D R63 and E R64 and the machine frequency register pair B R61 and C R62 are double precision register pairs which can hold the decimal point numbers until the next clock CK5 31 interrupt period for an enhancement of frequency control accuracy.

When the command frequency fc is larger than the machine frequency fm, the content of frequency increment register E R64 is added to the content of machine frequency register C R62 first, followed by an addition of the content of frequency increment register D R63 and the carry value to the content of machine frequency register B R61. When the command frequency fc is smaller than the machine frequency fm, the content of frequency increment register E R64 is subtracted from the content of machine frequency register C R62 first, followed by a subtraction of the content of frequency increment register D R63 and the borrow value from the content of machine frequency register B R61.

In S65, the subprogram goes to a unit sine function table 22 scanning speed updating subprogram (FIG. 7). The content of machine frequency register B R61 is stored as an updated machine frequency fm in S66. In S67, the V/F function table 23 is entered using the updated machine frequency fm where an updated machine voltage vm is obtained and stored in a machine voltage holding register G R66 in S68 and the subprogram goes to exit.

FIG. 7 is a unit scanning speed updating subprogram of the unit sine function table 22 of S65 in FIG. 6. In this subprogram, a content of a sine function table position increment register pair P R74 and Q R75 is updated every clock CK5 31 interrupt period (approximately 3.6864 ms) as shown in S62 and S75 in the PCWM signal encoder 25. The content of the machine frequency register pair B R61 and C R62 is loaded in a machine frequency holding register pair AH R71 and AL R72 in S71, and the content of the frequency multiplication factor register F R65, which contains kfmf, is loaded in a frequency multiplication factor holding register X R73 in S72. Then, in S73, a multiplication of A×X is carried out. The upper 8 bits provides the integer portion and the lower 8 bits provides the decimal portion of the sine function table position increment number per 2 interrupt intervals (102.4 µs).

When the above calculation result is divided by 2 in S74, this provides a sine table position with the upper 8 bits for the integer portion and the lower 8 bits for the decimal portion per 1 interrupt interval (51.2 µs) corresponding to the unit PWM pulse interval. For example, if the content of the machine frequency register pair B R61 and C R62 is hff00 (=255: integer portion only) and the content of the frequency multiplication factor register F R65 is h09 (=9), the multiplication result is 255×9/256/2=4.4824. This is the sine function table position increment number per CK3 29 interrupt period corresponding to the three sinusoidal wave motor drive signals 09 output frequency of 121.6 Hz (=4.4824×100000/51.2/720), where 4.4824×1000000/51.2 is the table position increment number per 1 second, and 720 is the unit sine table length. In S75, the result obtained in S74 is loaded in the sine function table position increment register pair P R74 and Q R75, and this subprogram goes to the exit.

FIG. 8 is a flow chart of a subprogram in which the unit sine function table position n is updated every CK3 29 interrupt period (51.2 µs) as shown in S81 and S82 in the PCWM signal encoder 25. An addition routine in S82 is entered where a sine function table position registers M R81, N R82, and L R83 are updated with the content of the sine function table position increment registers P R74 and Q R75. The sine function table position resisters M R81, N R82, and L R83 and the sine function table position increment register pair P R74 and Q R75 are double precision registers which can hold the decimal point numbers until the next CK3 29 interrupt period for an enhancement of frequency control accuracy.

In S82, the content of the sine function table position increment register Q R75 is first added to the content of the sine function table position register L R83 first, followed by an addition of a content of the sine function table position increment register P R74 and the Carry to the content of the sine function table position register pair M R81 and N R82. As a result, as shown in S83, the content of the sine function table position register pair M R81 and N R82 holds an updated unit sine function table position number n in S84, a new unit sine function numeric nu is fetched and stored in a unit sine function register H.

In S85, the PCWM signal encoding subprogram shown in FIG. 9 is called. In S86, the unit sine function table position n is incremented by 480 to advance the unit sine function table position n by 240°. The unit sine function table position n obtained in S86 is compared with 720 in S87, and if it does not exceed 720, the subprogram goes to S89. Otherwise, the subprogram proceeds to S88 where 720 is subtracted from the unit sine function table position n just calculated in S86 to reset the unit sine function table position n. In S82, S86 and S88 the decimal numbers are held in registers Q R75 and L R83 until the next CK3 29 interrupt period for an enhancement of frequency control accuracy.

After S88, the subprogram goes to S89 where it is checked whether the three phase sinusoidal motor drive signals 09 generation is completed. If it is not completed, the subprogram goes back to S84 and repeats the same process. If it is completed, this subprogram goes to exit.

FIG. 9 is a PCWM signal encoding subprogram in which the PCWM numerics d 26 are generated every CK3 29 interrupt period (51.2 µs) as shown in S81 and S100 inside the PCWM signal encoder 25. In S90 the unit function register H R80 (see FIG. 8) is loaded in the unit sine function holding register A R91 as a multiplicand. Also in S91 the machine voltage vm obtained in S68 and held in the machine voltage holding register G R66 is loaded in the machine voltage register X R92 which becomes a multiplier.

The polarity of the unit sine function numeric nu is determined by checking the most significant bit of nu in S92. If it is zero or nu is positive, S93 is entered and the multiplication of A×X is performed. The upper 8 bits of the result are stored in a register A R93 and are modulated on period numeric for nu >0. The lower 8 bits are stored in a register X R94, which represents the decimal number of the multiplication, and is not used. In S94, h80 is added to the content of the register A R93, which becomes an overall on period numeric. In S95, the 1's complement of the register A R93 in S94 is taken to get an overall off period numeric and the subprogram proceeds to S99.

If the most significant bit of the unit sine function numeric nu is 1 or nu is negative or zero, S96 is entered where the 1's complement of the content of the unit sine function holding register A R91 in S90 is taken to get an off period numeric for the unit sine function numeric nu. S97 performs the multiplication of A×X. The upper 8 bits of the result are stored in a register A R93 and are modulated off period numeric for nu≤40. The lower 8 bits of the result are stored in a register X R94, and is not used. In S98, h80 is added to the content of the register A R93, which becomes an overall off period numeric and the subprogram proceeds to S99.

In S99, the content of the register A R93 is a PWM one side modulation off period numeric 2d for the upper arm 15, V phase upper arm 17, and W phase upper arm 19, respectively. If nu>0, the output is 0≤2d<127 and if nu≤40, 127≤2d≤255 will result. In S100, the content of the register A R93 in S99 is divided by 2 to get the PCWM numerics d 26, which comprises three PWM center modulation off period numerics for the U-ph upper 15, V-ph upper 17, and W-ph upper 19 arms, respectively. The PCWM numerics d 26 are input to the PCWM signal decoder 27.

FIG. 10 is a time chart illustrating how the PCWM numerics d 26 generated in the PCWM signal encoder 25 in FIG. 9 are converted into a pulse width numeric in the unit PWM pulse interval in the PCWM signal decoder 27 according to one embodiment of the prior patent invention. The illustration shows both cases where the unit sine function numeric nu is positive and negative or zero.

Let us examine now the nu>0 case using a real numeric by referring to FIG. 10. Assume nu=h3e (62) and vm=h80 (128), where decimal number values are shown inside the parentheses for ease of calculation. In S93, A×X=62×128=7936. Taking the upper 8 bits of this multiplication result leads to 7936/256=h1f (31). In S94, adding h80 to the upper 8 bits leads to h9f (159). Then in S95, taking 1's complement of this result leads to h60 (96). In S99 of FIG. 9, 2d=96<127 is obtained. The output in S100 is thus d=h30 (48), which becomes the PWM center modulation off period numeric d for the upper arms 15, 17, and 19 in the gate drive and power transistor circuitry 08.

Let us now examine the nu≤40 case assuming nu=hc1 (193) and vm=h80 (128). In S96, taking 1's complement of hc1 (193) results in h3e (62). Thus, in S97, A×X=62×128=7936. Taking the upper 8 bits of this multiplication result leads to 7936/256=h1f (31). In S98, adding h80 to the upper 8 bits leads to h9f (159). In S99 of FIG. 9, 2d=159>127 is obtained. The output in S100 is thus d=h4f (79) which becomes the PWM center modulation off period numeric d for the upper arms 15, 17, and 19 in the gate drive and power transistor circuitry 08.

FIG. 11 is a comparison chart for the PCWM signal decode 27 output waveforms illustrating how the side modulation and the center modulation upper arms' signals look in the unit PWM pulse interval of 51.2 μs according to one embodiment of the prior patent invention. The comparison is made for the unit sine function numeric nu positive, zero, and negative cases.

FIG. 12 is a block diagram showing the detailed inside of the PCWM signal decoder 27 in the ASIC 06 according to one embodiment of the prior patent invention. The PCWM signal decoder 27 updates the center modulation PWM signals g 07 every CK3 29 interrupt period (51.2 μs). The center modulation PWM signals g 07 comprise three upper arms' output signals 37 to drive the upper arms 15, 17, and 19 and three lower arms' output signals 38 to drive the lower arms 16, 18, and 20 which are both located in the gate drive and power transistor circuitry 08.

During the past CK3 29 interrupt period, the PCWM signal decoder 27 receives the PCWM numerics d 26 from the PCWM signal encoder 25 and writes the data into a D Flip-Flop 32. As described in S100 of FIG. 9, the PCWM numerics d 26 represents the PWM center modulation front-half off period numeric for the upper arms 15, 17, and 19 in the gate drive and power transistor circuitry 08 (see FIG. 13 described later). The lower arms 16, 18, and 20 are provided their signals from the opposite output terminals of a Toggle F/F 36. A 7-Bit Up-Counter 34 inputs d 33 at CK3 29 and d 33 at CK4 30 clock signals, and outputs a signal cry 35 at the CK4 30 when the 7-Bit Up-Counter 34 reaches the full count of h7f.

The CK1 28 is used as the clock signal for the 7-Bit Up-Counter 34 and the Toggle F/F 36. For the 7-Bit Up-Counter 34 the numeric d 33 is loaded for the front-half off period d 26 generation and the numeric d 33 for the rear-half off period d26 generation in the unit PWM pulse interval as depicted in FIG. 13. The 7-Bit Up-Counter 34 loads 1's complementary numbers to generate the desired output.

The Toggle F/F 36 reverses the output polarity every time when it receives the cry 35 from the 7-Bit Up-Counter 34 and the clocks CK3 29 or CK4 30 from the clock generator 21, and generates the three upper arms' drive signals 37 and the three lower arms' drive signals 38. The polarities of the three lower arms' drive signals 38 are opposite to the three upper arms' drive signals 37. For the brevity of explanation, dead times between the upper arms' and the lower arms' signals 37 and 38 are omitted here. The center modulation PWM signals g 07 are thus generated and input to the gate drive and power transistor circuitry 08.

FIG. 13 shows an example of a unit PWM pulse polarity characteristic for the upper arms' signals when the unit sine function numeric nu is positive as a function of the normalized time in the unit PWM signal interval according to one embodiment of the prior patent invention. As shown in the illustration, when the unit sine function numeric nu is zero, there is no modulation and the pulse duty is 50% and d=0.25. When the unit sine function numeric nu is positive, the pulse duty is more than 50% and d<0.25. When the unit sine function numeric nu is negative, the pulse duty is less than 50% and d>0.25. Note that d+d=1. The modulated signal portions are split into the front-half and the rear-half portions.

FIG. 14 is a comparison chart showing that the interconduction between the upper and lower arms of the power transistor creates twice per each power transistor interval compared to once for the side modulation PWM signal according to one embodiment of the prior patent invention. The example chart shows the case where the U phase upper arm 15 and the V phase lower arm 18 are conducting.

BRIEF DESCRIPTION OF THE DRAWINGS

FIG. 3 is a unit sine function table referred to by the PCWM signal encoder when obtaining a unit sine function numeric by inputting a unit sine function table position number according to one embodiment of the prior patent invention.

FIG. 7 is a unit sine function table scanning speed updating subprogram working with the subprogram in FIG. 6 according to one embodiment of the prior patent invention.

FIG. 9 is a PCWM signal encoding subprogram working with the subprogram in FIG. 8 in which a center modulation front-half off period numeric is updated according to one embodiment of the prior patent invention.

FIG. 16 is a comparison chart between vector control and torque control according to one embodiment of the present disclosure.

FIG. 18 is an external rotor type permanent magnet motor simplified drawing with the extended view according to one embodiment of the present disclosure.

DETAILED DESCRIPTION OF PREFERRED EMBODIMENTS

Example Problem to be Solved

Figure 1:
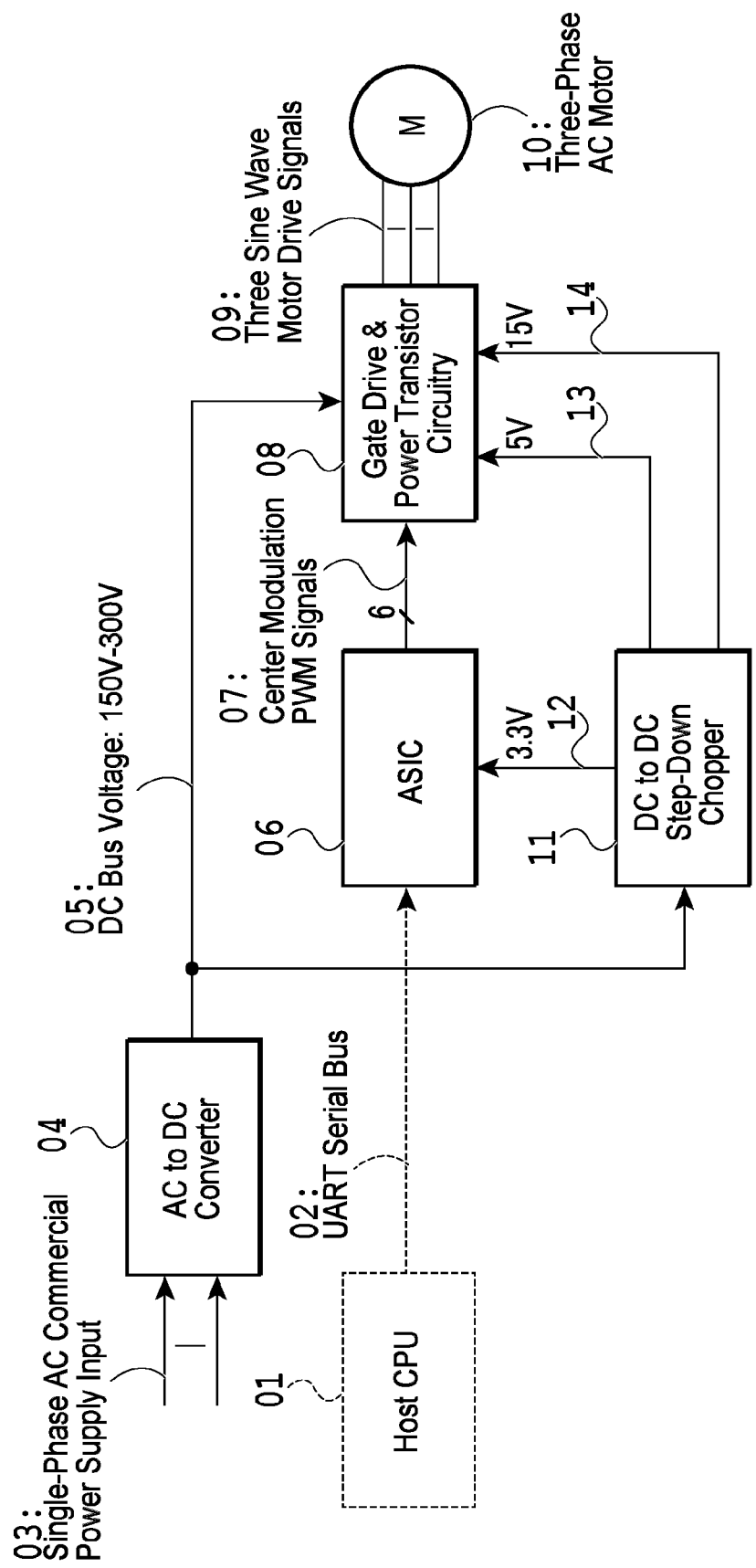
FIG. 1 is a block diagram showing an embodiment of a motor drive system according to one embodiment of the prior patent invention.

Globally, motors consume nearly 60% of the whole electric power usage. In order to alleviate the global warming effect, realization of low carbon society is preached. There is enough room to reduce $CO_2$ by enhancing the efficiencies of motors.

An object of the present disclosure is to present a synchronous motor drive system and a synchronous motor drive method with high efficiency.

Example Means for Solving the Problem

According to the first aspect of the present disclosure, a synchronous motor drive system comprises: a synchronous motor; a load angle sensor for measuring a load angle of the synchronous motor; and a controller for generating a drive signal based on an input frequency command and the measured load angle, and supplying the drive signal to the synchronous motor.

Here, the synchronous motor may be a permanent magnet motor, the permanent magnet motor may comprise: a rotor comprising a permanent magnet; and a stator comprising an armature, the synchronous motor drive system may further comprise a permanent magnet magnetic flux sensor for detecting a permanent magnet magnetic flux, and the load angle sensor may measure a phase difference between an armature magnetic flux and the permanent magnet magnetic flux to measure the load angle.

Here, the controller may send an armature magnetic flux phase signal representing a phase of the armature magnetic flux to the load angle sensor, the permanent magnet magnetic flux sensor may send a permanent magnet magnetic flux phase signal representing a phase of the permanent magnet magnetic flux to the load angle sensor, and the load angle sensor may measure the phase difference between the armature magnetic flux and the permanent magnet magnetic flux based on the armature magnetic flux phase signal and the permanent magnet magnetic flux phase signal.

Here, the controller may send an on/off signal representing a magnitude of the armature magnetic flux, as the armature magnetic flux phase signal, and the permanent magnet magnetic flux sensor may send an on/off signal representing a magnitude of the permanent magnet magnetic flux, as the permanent magnet magnetic flux phase signal.

Here, the controller may apply a sine wave voltage to the permanent magnet motor, express a phase of the voltage in n ways (n is an integer equal to or greater than 2), and send n pulses to the load angle sensor during one period of the voltage, and the load angle sensor may measure the load angle by measuring the number of pulses which corresponds to the phase difference between the armature magnetic flux and the permanent magnet magnetic flux corresponds to.

Here, the permanent magnet magnetic flux sensor may be a Hall sensor.

Here, the controller may comprise: a load angle control block for generating a voltage command based on the frequency command and the measured load angle to control the load angle; a PWM signal generator for generating a PWM signal based on the frequency command and the voltage command; and an inverter for generating the drive signal based on the PWM signal.

Here, the load angle control block may comprise: a voltage command generator for generating the voltage command; a target load angle table storing a target load angle to be targeted for a frequency and a voltage applied to the synchronous motor; a target load angle determination block for determining the target load angle based on the frequency command and the voltage command by referring to the target load angle table; and a load angle error calculator for calculating a load angle error between the target load angle and the measured load angle, and the voltage command generator may adjust the voltage command to be generated based on the load angle error.

According to the second aspect of the present disclosure, a synchronous motor drive method for driving a synchronous motor, comprises: a step of receiving input of a frequency command; a load angle measurement step of measuring a load angle of the synchronous motor; and a step of generating a drive signal based on the frequency command and the measured load angle, and supplying the drive signal to the synchronous motor.

Here, the synchronous motor may be a permanent magnet motor, the permanent magnet motor may comprise: a rotor comprising a permanent magnet; and a stator comprising an armature, the synchronous motor drive method may further comprise a step of detecting a permanent magnet magnetic flux, and the load angle measurement step may measure a phase difference between an armature magnetic flux and the permanent magnet magnetic flux to measure the load angle.

Here, the load angle measurement step may define an armature magnetic flux axis at a position which is delayed from an armature voltage axis by $\pi/2$ in electric angle, and measure a phase difference between the armature magnetic flux and the permanent magnet magnetic flux relative to the armature magnetic flux axis.

According to the third aspect of the present disclosure, a synchronous motor drive system comprises: a synchronous motor; a power factor angle sensor for measuring a power factor angle of the synchronous motor; and a controller for generating a drive signal based on an input frequency command and the measured power factor angle, and supplying the drive signal to the synchronous motor.

Here, the synchronous motor drive system may further comprise a terminal current detection sensor for detecting a terminal current of the synchronous motor, and the power factor angle sensor may measure a phase difference between a terminal voltage of the synchronous motor and the terminal current to measure the power factor angle.

Here, the controller may send a voltage phase signal representing a phase of the terminal voltage to the power factor angle sensor, the terminal current detection sensor may send a current phase signal representing a phase of the terminal current to the power factor angle sensor, and the power factor angle sensor may measure the phase difference between the terminal voltage and the terminal current based on the voltage phase signal and the current phase signal.

Here, the controller may send an on/off signal representing a magnitude of the terminal voltage, as the voltage phase signal, and the terminal current detection sensor may send an on/off signal representing a magnitude of the terminal current, as the current phase signal.

Here, the controller may apply a sine wave voltage to the synchronous motor, express a phase of the voltage in n ways (n is an integer equal to or greater than 2), and send n pulses to the power factor angle sensor during one period of the voltage, and the power factor angle sensor may measure the power factor angle by measuring the number of pulses which corresponds to the phase difference between the terminal voltage and the terminal current corresponds to.

Here, the controller may comprise: a power factor angle control block for generating a voltage command based on the frequency command and the measured power factor angle to control the power factor angle; a PWM signal generator for generating a PWM signal based on the frequency command and the voltage command; and an inverter for generating the drive signal based on the PWM signal.

Here, the power factor angle control block may comprise: a voltage command generator for generating the voltage command; a target power factor angle table storing a target power factor angle to be targeted for a frequency and a voltage applied to the synchronous motor; a target power factor angle determination block for determining the target power factor angle based on the frequency command and the voltage command by referring to the target power factor angle table; and a power factor angle error calculator for calculating a power factor angle error between the target power factor angle and the measured power factor angle, and the voltage command generator may adjust the voltage command to be generated based on the power factor angle error.

According to the fourth aspect of the present disclosure, a synchronous motor drive method for driving a synchronous motor, comprises: a step of receiving input of a frequency command; a power factor angle measurement step of measuring a power factor angle of the synchronous motor; and a step of generating a drive signal based on the frequency command and the measured power factor angle, and supplying the drive signal to the synchronous motor.

Here, the synchronous motor drive method may further comprise a step of detecting a terminal current of the synchronous motor, and the power factor angle measurement step may measure a phase difference between a terminal voltage of the synchronous motor and the terminal current to measure the power factor angle.

Example Effect of Certain Embodiments

According to the present disclosure, a synchronous motor drive system and a synchronous motor drive method with high efficiency can be presented.

In the following, by referring to the figures, embodiments of the present disclosure will be described in detail.

First Embodiment

In the first embodiment of the present disclosure, a permanent magnet motor (more specifically, a three phase permanent magnet motor) is used as a synchronous motor.

The first embodiment of the present disclosure relates to an inexpensive inverter system which can yield equal or higher efficiency compared to a vector control inverter in a simpler method for a three phase permanent magnet motor, which is characterized as a higher efficiency motor.

The present embodiment presents an inverter system for a permanent magnet motor which directly tracks the optimal efficiency by torque control using a load angle, despite its inexpensive structure.

Problems to be resolved by the present embodiment are as follows.

(1) Defining an attracting action between an electromagnet (armature) of a motor stator and a permanent magnet of a motor rotor by using a numerical expression model of electromagnetic induction theory.

(2) Realizing a control system model in a static coordinate system which can drive a permanent magnet motor by sinusoidal wave to obtain the optimal efficiency, contrary to a vector control counterpart.

(3) Defining a motor load angle as an index of efficiency control.

(4) Forming a table consisting of a set of values of load angles at which the motor efficiency is optimal for the number of rotations of the drive motor in accordance with the magnitude of the load, by conducting a load test on the motor in advance, and adjusting the applied voltage on the motor to make the counted load angle value coincide with the ideal value stored in the table.

(5) Conducting measurement of the motor load angle by converting the sine wave of each of the armature magnetic flux and the permanent magnet magnetic flux to an on/off signal (e.g. signal which becomes on when the value is zero or more, and off when the value is less than zero), and detecting the phase difference between the signals after the conversion.

(6) Enabling to count digitally what percentage of the wavelength at the current drive frequency the magnitude of the load angle becomes.

(7) Making the control circuit simpler and smaller.

The PCWM inverter, on which the present embodiment is based, is one which drives the PMAC motor by sinusoidal wave signal in an open loop mode without sensing the rotor position.

The present embodiment enables the inverter system to operate constantly at the optimal efficiency point in closed loop control by installing only one sensor on the motor stator to detect the phase of the rotor.

The first feature of the present embodiment is to investigate an attracting action between the electromagnet (armature) of the motor stator excited by the inverter and the permanent magnet installed on the rotor under the condition of the fixed rotation axis. Specifically, it is to figure out what rotating motion the rotor does by using a numerical expression model based on the electromagnetic induction theory, when the magnetic flux by the rotating magnetic field of the electromagnet (armature magnetic flux) is defined as the driving side and the magnet flux by the permanent magnet (permanent magnet magnetic flux) of the rotor is defined as the tracking side.

The second feature of the present embodiment is (a) to define the armature magnetic flux axis which is delayed from the armature voltage axis by ¼ wavelength as the base armature magnetic flux axis, and (b) to conduct control using a fixed coordinate system (stationary coordinate system). The present embodiment employs a fixed coordinate system (stationary coordinate system) contrary to vector control which uses a rotating coordinate system. In the PCWM method of the present embodiment, the number of data in the sine wave 360° function table is stored as digital information of a multiple of 6. Such method is impossible for an existing conventional inverter system.

The third feature of the present embodiment is (a) to define a load angle as an index for realizing the optimal efficiency, and obtain the value of the load angle at which the efficiency is optimal in accordance with the magnitude of the load by conducting a load test on the inverter and motor in advance, (b) to obtain the relationship between the command voltage and the target load angle which realizes the optimal efficiency in the form of a table in advance, and (c) to build a model follower adaptive control system which adjusts the command voltage so that the value of the counted load angle coincides with the ideal value stored in the table in a real machine.

The fourth feature of the present embodiment is to conduct measurement of the motor load angle by converting the sinusoidal wave of each of the armature magnetic flux and the permanent magnet magnetic flux to a 50% duty on/off signal, and detecting the phase difference between the signals after the conversion.

The fifth feature of the present embodiment is that in contrast with the first carrier used in the PCWM method which has a constant frequency, the period of the sine wave of the voltage applied to the motor changes in accordance with the drive frequency, and therefore by using the second carrier which is synchronized to the sine wave frequency, the present embodiment makes it possible to count digitally what percentage of the wavelength at the current drive frequency the magnitude of the load angle becomes. Especially, using the second carrier for measuring the load angle is impossible for an existing conventional inverter system. In the PCWM method of the present embodiment, carrier frequency control is operated as digital information.

The sixth feature of the present embodiment is characterized as a full-digital construction by not using ND converters and many sensor circuits and consisting of fewer and less expensive parts in order to make the control circuit simpler and smaller.

Figure 15:
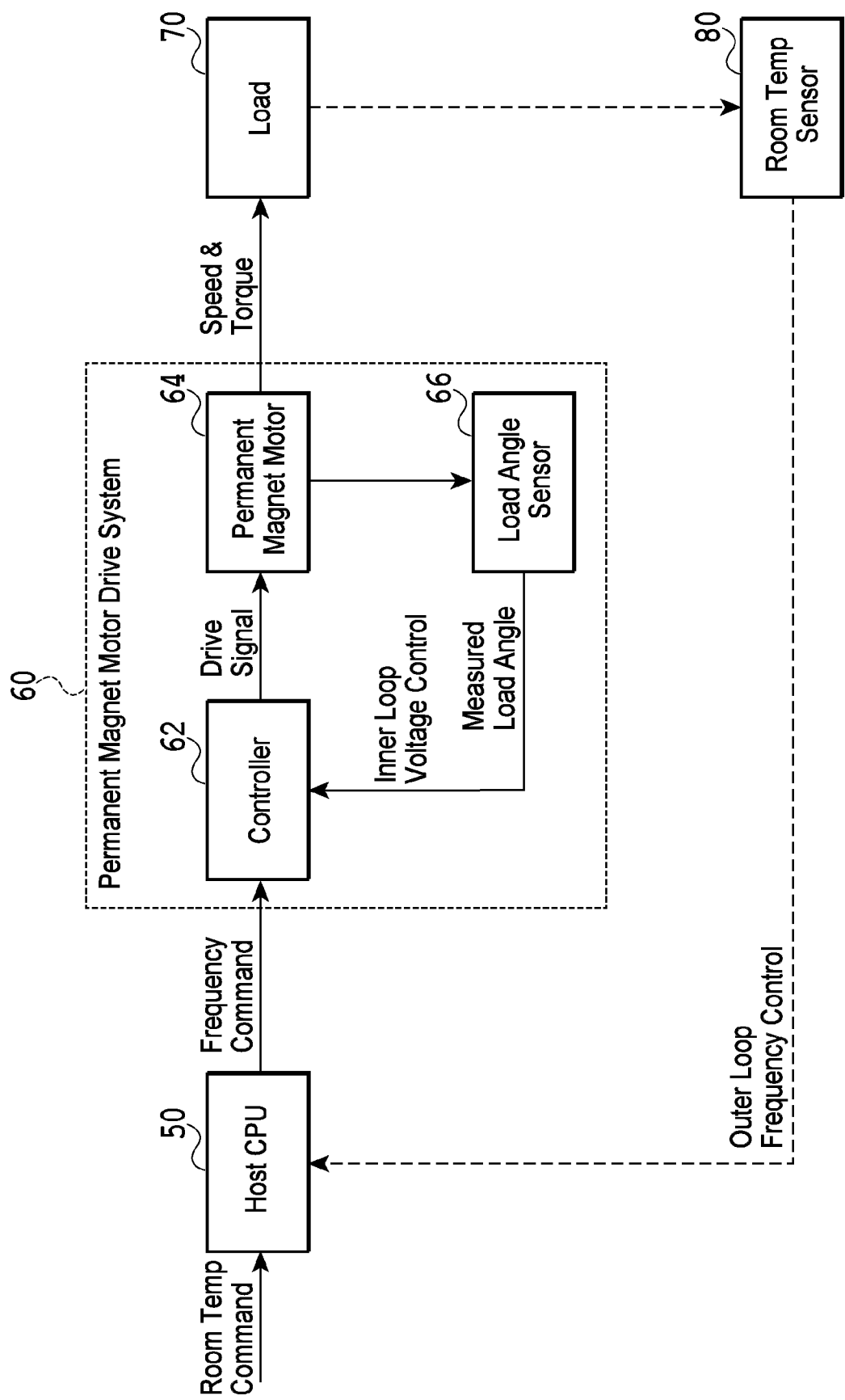
FIG. 15 is a block diagram showing a motor drive feedback control system using a load angle as the primary controlled variable according to one embodiment of the present disclosure.

FIG. 15 illustrates a permanent magnet motor drive system (synchronous motor drive system) in the first embodiment of the present disclosure, and represents a circuit block diagram for an efficiency control of either an air conditioner or a fan. The permanent magnet motor drive system 60 of the present embodiment comprises a controller 62, a permanent magnet motor 64, and a load angle sensor 66. In the present embodiment, as a load 70, for example, an air conditioner or a fan is assumed. When a user inputs a room temperature command to a host CPU 50, the host CPU 50 inputs a frequency command which depends on the room temperature command, to the controller 62 inside the permanent magnet motor drive system 60. The controller 62 generates a drive signal which depends on the frequency command, and supplies it to the permanent magnet motor 64. The permanent magnet motor 64 operates in accordance with the drive signal, and supplies a speed and a torque to the load 70. The load (air conditioner or fan) 70 operates in accordance with the speed and the torque, and the room temperature changes.

In the present embodiment, a load angle is controlled by regulating a voltage in an inner loop. That is, the load angle sensor 66 measures the load angle of the permanent magnet motor 64, and supplies it to the controller 62. The controller 62 generates the drive signal based on the frequency command and the measured load angle. Here, for the number of rotations of the permanent magnet motor 64, in accordance with the magnitude of the load, there exists the value of the load angle (target load angle) at which the efficiency of the permanent magnet motor 64 becomes optimal. The controller 62 generates the drive signal by controlling (adjusting) the applied voltage independently of the applied frequency so that the supplied measured load angle approaches the target load angle, and thereby the optimal efficiency can be achieved.

Further, in the present embodiment, frequency control is conducted in an outer loop. That is, a room temperature sensor 80 measures the room temperature, and supplies it to the host CPU 50. The host CPU 50 controls (adjusts) the frequency command in accordance with the supplied room temperature.

Further, it is noted that a compressor, etc. may be employed as the load 70.

FIG. 16 is a comparison chart of vector control with torque control (inverter) of the present embodiment.

Figure 17:
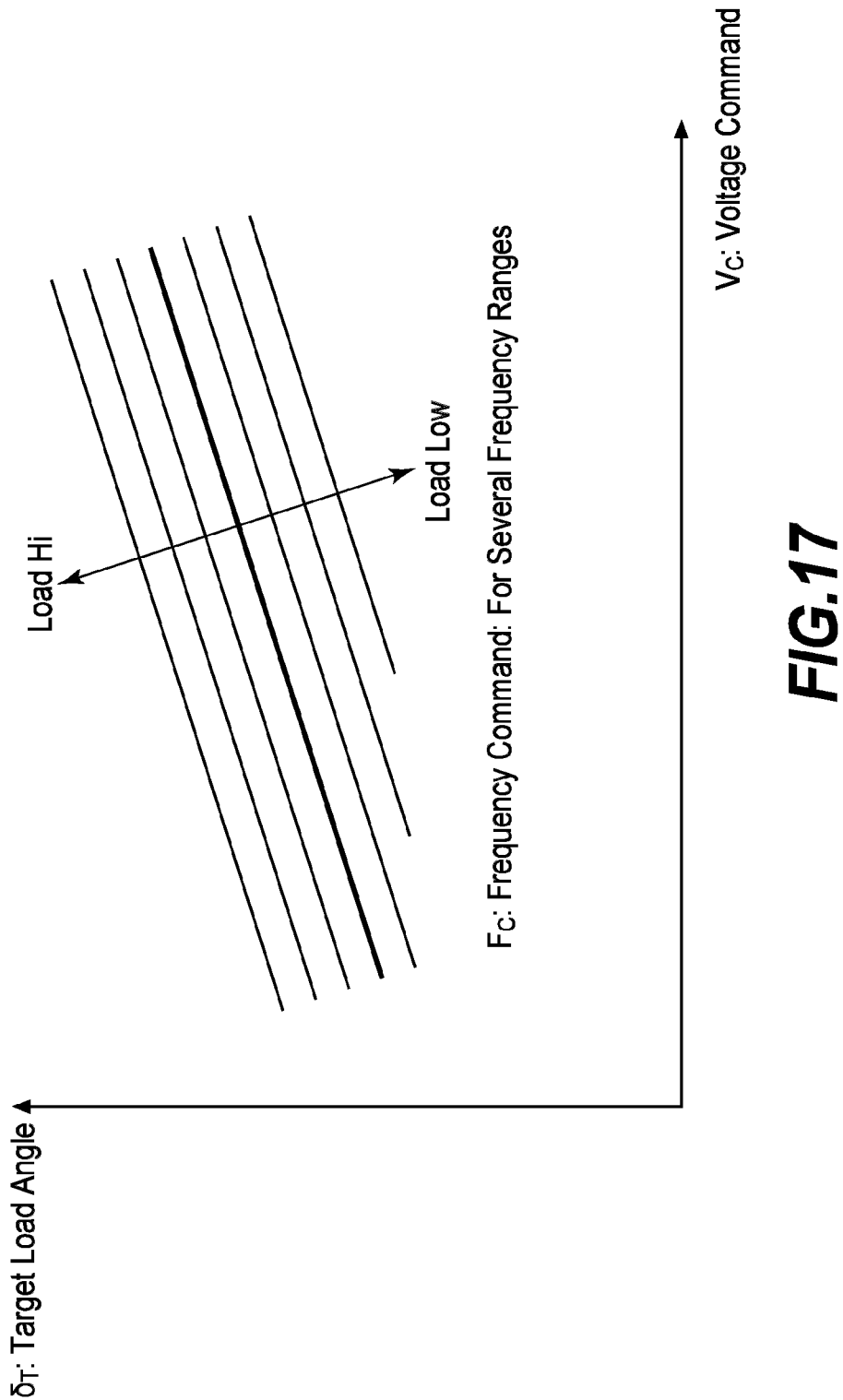
FIG. 17 is a chart of target load angle vs. voltage command with load levels as the parameter for certain frequency ranges obtained by a load test according to one embodiment of the present disclosure.

FIG. 17 is a diagram showing one example of an optimal efficiency data table obtained as a result of conducting a load test on a motor. We will explain this further later.

The motor rotor equation of motion described here is defined using stationary cylindrical coordinate system, which is employed throughout the present analysis. The stator winding located inside the motor is magnetized by a digitalized sinusoidal wave from the driving inverter. Ferrite magnets (permanent magnets) are attached to the inside of the motor rotor forming the motor outer shell, and are magnetized by sinusoidal waveform as well.

In this analysis, we initially assume a two-pole/six slot motor and expand it onto the 2-D plane. For simplicity, we assume a motor configuration having no salient poles. Further, the analysis is performed for the U phase as the representative axis. FIG. 18 shows a synchronous motor model and its 2-D expansion view used in the present embodiment.

In FIG. 18, assuming the moment when the armature current in the U phase is maximum, the rotating magnetic flux $\Phi a$ generated by the armature current (armature reaction magnetic flux) which includes magnetic fluxes generated by the V phase and W phase currents is on the winding axis of the U phase. By noting that the rotating magnetic flux is rotating at the synchronous speed toward the CCW (counterclockwise) direction in the direction of the phase order, the electromotive force $Ea=-jXaI$ generated by this magnetic flux is delayed from the current I by $\pi/2$. When this is treated as a voltage drop, the sign changes and it becomes advanced from I by $\pi/2$.

The voltage drop $jxlI$ by the armature leakage reactance is also advanced from I by $\pi/2$, and the sum of the two voltage drops $j(Xa+xl)$ $I=jXsI=$the synchronous reactance drop is also advanced from I by $\pi/2$.

If the center of the magnetic pole at the moment when the current of the U phase is maximum is at the position which is delayed from the winding axis of the U phase by $\zeta$ as shown in FIG. 18, the electromotive force E (We assume that the direction opposite to I is positive.) generated in the U phase by the rotation of the magnetic flux $\Phi m$ by the magnetic pole at the synchronous speed toward the CCW direction in the direction of the phase order is delayed from $jXsI$ in phase by $\zeta$.

Further, when the armature winding and inverter lead resistance r is considered, the winding resistance equivalent magnetic flux $\Phi r$ by this is in phase with I, and is delayed from $\Phi a$ by $\pi/2$.

Figure 19:
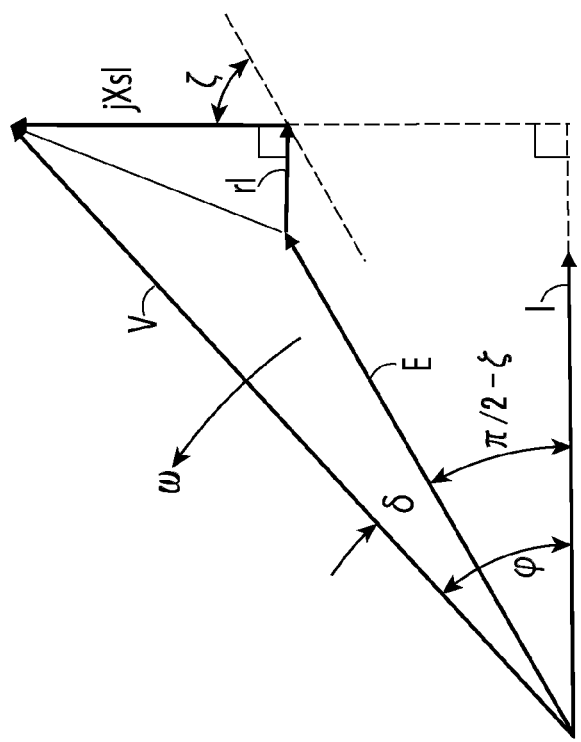
FIG. 19 is a vector diagram showing relations among motor variables according to one embodiment of the present disclosure.

The vector summation of E, rI and jXsI must be the power supply voltage V applied to the U phase, and therefore the vector diagram of the U phase is obtained as shown in FIG. 19.

Figure 20:
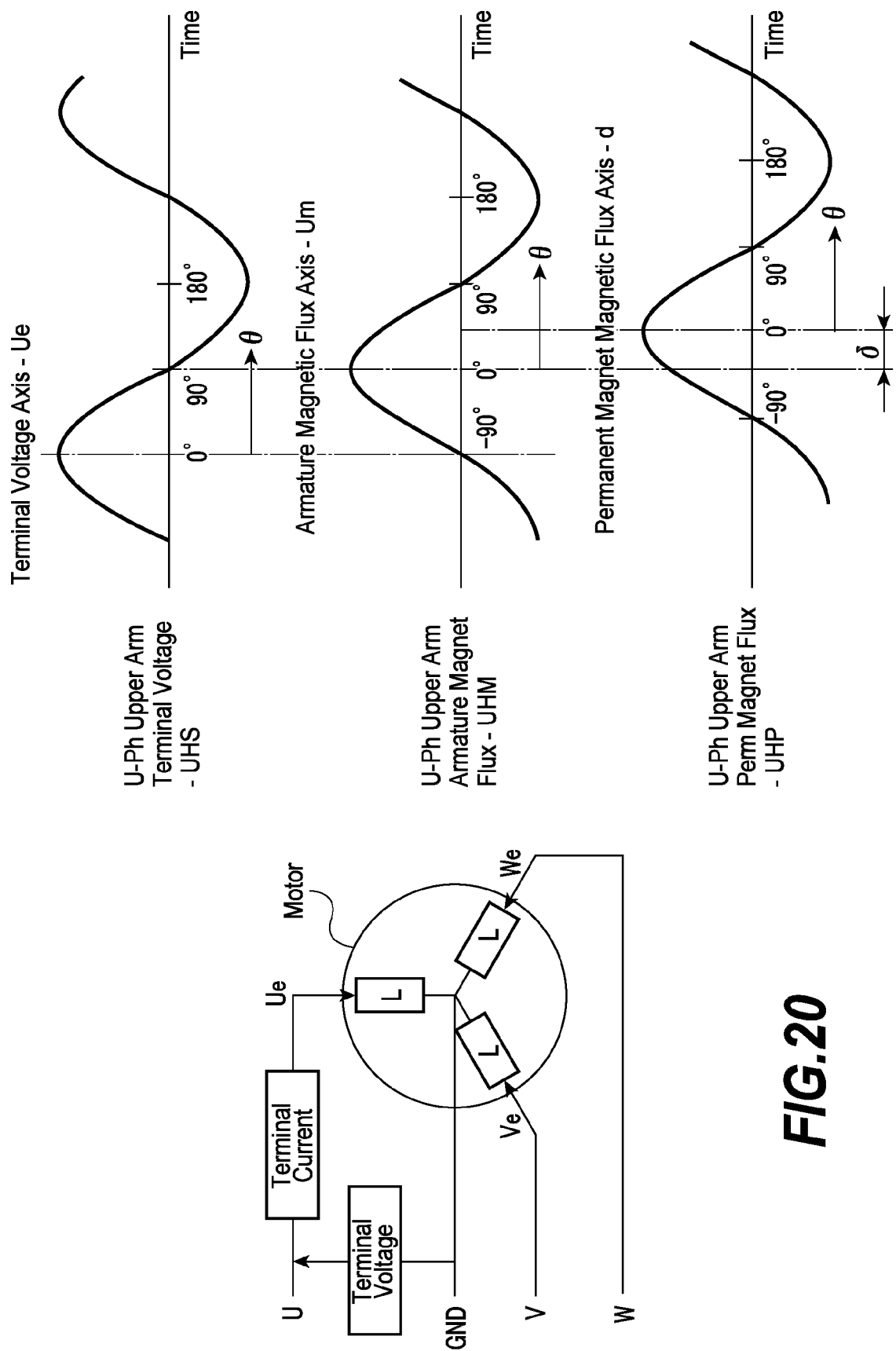
FIG. 20 is a time chart of showing relations among terminal voltage, armature magnetic flux, and permanent magnetic flux, for a U-phase upper arm as the example according to one embodiment of the present disclosure.

By referring to FIG. 20, we start the analysis using the following equation of electromagnetic induction.

$$V=d\Phi e(\theta)/dt=p\Phi e(\theta) \quad (1)$$

where $V=V1 \sin(\theta)$;

V1: Maximum voltage applied from the inverter at the U phase terminal;

$\theta$: Rotational angle from the U phase terminal voltage axis Ue, CCW positive;

$\Phi e=-\Phi e1 \cos(\theta)$: Armature magnetic flux at a rotational angle $\theta$ $\Phi e1$: Positive maximum value of the armature magnetic flux induced by the U phase terminal voltage; and p: Differentiation operator.

The equation (1) indicates that the phase of the armature magnetic flux $\Phi e$ is delayed from the phase of the terminal voltage V by $\pi/2$.

In other words, the armature magnetic flux $\Phi e$ at a phase angle of $\theta$ from the U phase terminal voltage axis Ue is $$\Phi e=-\Phi e1 \cos(\theta) \quad (2)$$

In order to deal with the interaction with the permanent magnet magnetic flux, it is convenient to define the armature magnetic flux axis Um by rotating the base axis of the armature magnetic flux $\Phi e$ in the clockwise direction by $\pi/2$ in the x-y plane from the U phase terminal voltage axis Ue. By using this redefinition, the armature magnetic flux $\Phi e$ can be written as.

$$\Phi e=\Phi e1 \sin(\theta) \quad (3)$$

where $\theta$: Rotational angle from the U phase armature magnetic flux axis Um, CCW positive.

A further manipulation of the equation (1) results in $$V = p\Phi e = j\omega \Phi e \qquad (4)$$

Rewriting equation (4) for Φe results in $$\Phi e = V/j\omega = -jV/\omega \qquad (5)$$

Similarly to the equation (1), the following equation of electromagnetic induction can be defined.

$$E = d\Phi m(\theta)/dt = p\Phi m(\theta) \qquad (6)$$

where
E=E1 sin (θ);
E1: Maximum voltage induced by the permanent magnet;
θ: Rotational angle from the U phase permanent magnet voltage axis q, CCW positive;
Φm=−Φm1 cos (θ): Permanent magnet magnetic flux at a rotational angle θ
Φm1: Positive maximum value of the permanent magnet magnetic flux induced by the permanent magnet;
p: Differentiation operator;

The equation (6) indicates that the phase of Φm is delayed from the phase of the permanent magnet voltage E by π/2.

When the permanent magnet magnetic flux axis d is defined by rotating the base axis of the permanent magnet magnetic flux Φm from the permanent magnet voltage axis q by π/2 in the clockwise direction, the permanent magnet magnetic flux Φm can be written as $$\Phi m = \Phi m1 \sin(\theta) \qquad (7)$$

where
θ: Rotational angle from the U phase permanent magnet magnetic flux axis d, CCW positive.

Similarly to the equation (5), $$\Phi m = -jE/\omega \qquad (8)$$

When considering the winding resistance r of the armature winding including the inverter lead, the winding resistance equivalent magnetic flux Φr is defined as follows.

$$\Phi r = -jrI/\omega \qquad (9)$$

By referring to FIG. 19, we will analyze the following conventional motor circuit equation.

$$V = E + rI + jXsI \qquad (10)$$

where
r: Winding resistance;
Xs: Synchronous Reactance=ωLs;
Ls: Synchronous Inductance.

Multiplying both sides of equation (10) by −j/ω, it becomes $$-jV/\omega = -jE/\omega - jrI/\omega + XsI/\omega = -jE/\omega - jrI/\omega + LsI \qquad (11)$$

Substituting equations (5), (8) and (9) into equation (11) yields $$\Phi e = \Phi m + + LsI \qquad (12)$$

Newly defining the synchronous inductance magnetic flux Φa as follows.

$$= LsI \qquad (13)$$

The equation (12) further turns to the equation (14) as a vector relationship of magnetic fluxes.

$$\Phi e = \Phi m + \Phi r + \Phi a \qquad (14)$$

Figure 21:
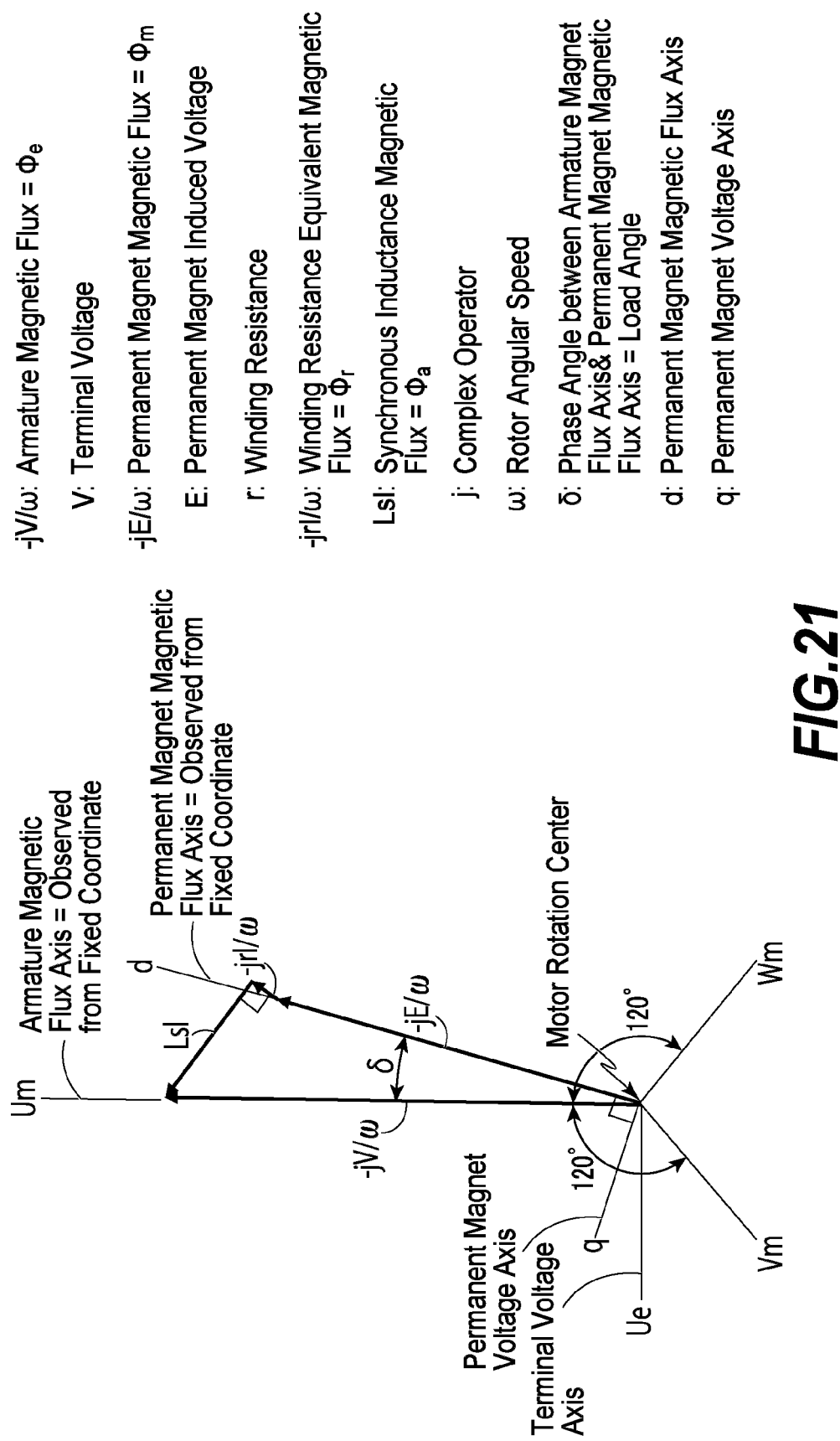
FIG. 21 is a vector diagram defining a load angle as a function of motor variables according to one embodiment of the present disclosure.

The relationship of the equation (14) is illustrated as a vector diagram in FIG. 21.

Traditionally, we have the following motor torque equation, $$T = k\{|V||E|/(\omega Xs)\}\sin\delta = k\{V1E1/(\omega Xs)\}\sin\delta \qquad (15)$$

where
k=3P/2: Constant number;
P: Number of motor poles;
V1: Maximum voltage applied from the inverter at the U phase terminal;
E1: Maximum voltage induced by the permanent magnet;
ω: Motor rotation angular speed.

Substituting the equation of the synchronous reactance Xs=ωLs which is defined in equation (10) in equation (15) results in $$T = k\{V1E1/(\omega 2Ls)\}\sin\delta = k\{(V1/\omega)*(E1/\omega)/Ls)\}\sin\delta \qquad (16)$$

where $$|\Phi e| = \Phi e1 = V1/\omega \qquad (17)$$

$$|\Phi m| = \Phi m1 = E1/\omega \qquad (18)$$

Figure 22:
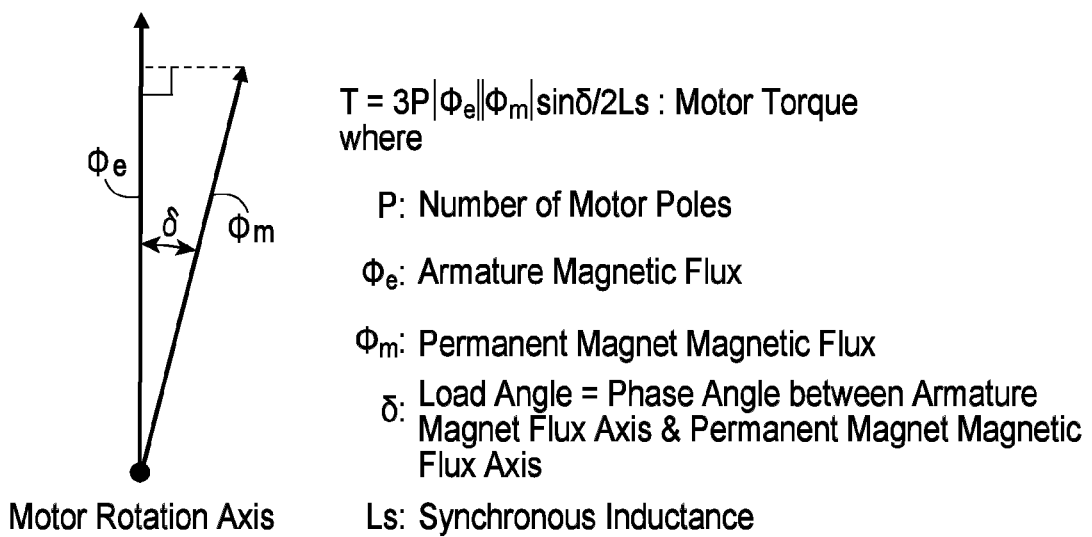
FIG. 22 is a vector diagram showing the motor torque is defined by the product of armature magnetic flux, permanent magnetic flux, and load angle for a small load angle according to one embodiment of the present disclosure.

Substituting equations (17) and (18) in equation (16) and arranging it result in $$T = k|\Phi e||\Phi m|\sin\delta/Ls \qquad (19)$$

where
δ: Load angle=Included angle between the permanent magnet magnetic flux axis and the armature magnetic flux axis Equation (19) indicates the motor torque is proportional to the area surrounded by the oblique sides Φe and Om and their included angle δ. This motor torque equation is illustrated in FIG. 22.

From this, it is noted that the motor torque is approximately proportional to the load angle δ when the load angle δ is small.

The maximum value of the permanent magnet magnetic flux induced by the permanent magnet is given and unchangeable. However, the present inverter can precisely control the voltage value of the applied voltage (i.e. the terminal voltage of an armature winding) independently from the applied frequency. Therefore, it can realize the optimum efficiency by changing the magnitude of the armature magnetic flux in accordance with the speed and the magnitude of the load of the motor.

The load angle measurement and control of the present embodiment are not always executed during the entire motor drive. They are operational within certain motor speed ranges in which the motor has entered into a steady operation. For the motor drive in a transient state of increasing or decreasing the speed of the motor, an open loop control is executed by fully utilizing the character of a PCWM scheme employed by the present embodiment. The frequency of the load angle measurement and control of the present embodiment may be control of an extremely long interval such as on a "minute" basis. However, at the time of detecting the load angle, real time processing of a short interval by a counting signal PCK which is output from the PCWM signal encoder, described later, is preferable.

A 24-poles/18-slots external rotor type motor is preferable for practical use. A method for measuring the motor load angle for such motor will be explained by using FIG. 23 which shows one embodiment.

The rotational angle of the rotor (electric angle) θ during one cycle of the driving sinusoidal wave of the motor is $$\theta = 2\pi/(24/2) = \pi/6 \tag{20}$$

As the above-described equation (1) indicates that the armature magnetic flux axis Um is delayed from the armature voltage axis Ue by ¼ wavelength, when the equation (20) is multiplied by this value, the included angle between the two axes is given as follows:

$$\tfrac{1}{4}\theta = \pi/(6*4) = \pi/24 = 7.5° \tag{21}$$

In the present embodiment, the motor load angle is measured by defining the armature magnetic flux axis Um at the position which is delayed from the armature voltage axis Ue by π/2 (¼ wavelength) in electric angle, and measuring the phase difference between the armature magnetic flux and the permanent magnet magnetic flux relative to the armature magnetic flux axis Um.

The measurement of the motor load angle is made by converting the sinusoidal wave of each of the armature magnetic flux and the permanent magnet magnetic flux to 50% duty on/off signal, and measuring the phase difference between the signals after the conversion. Thereby, an ND converter for measuring an amplitude becomes unnecessary, and a signal processing circuit which is tolerant to external noises can be realized. Further, in contrast with the first carrier (CK3 described later) used in the PCWM scheme which has a constant frequency, the period of the sine wave of the voltage applied to the motor changes in accordance with the drive frequency, and therefore by using the second carrier (the counting signal PCK described later) which is synchronized to the sine wave frequency, what percentage of the wavelength at the current drive frequency the magnitude of the load angle becomes, is digitally counted.

Figure 23:
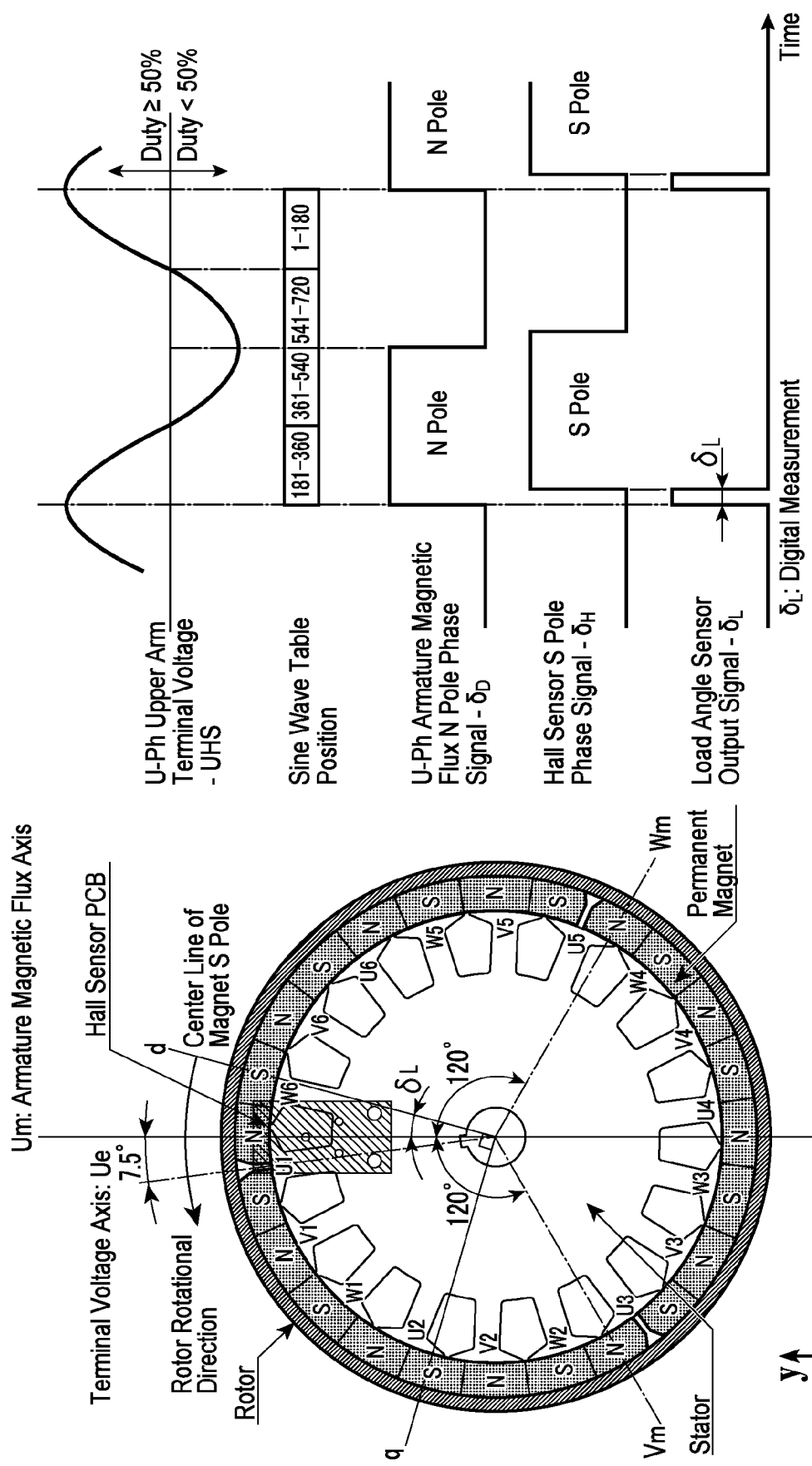
FIG. 23 is a control diagram and the associated time chart showing how the control is mechanized using the load angle as a controlled variable according to one embodiment of the present disclosure.

In FIG. 23, the sinusoidal wave of the armature magnetic flux is converted to an on/off signal δD representing the magnitude of the armature magnetic flux. The conversion is conducted inside the PCWM signal encoder 116, which is described later. That is, the sinusoidal wave is converted to a signal which becomes on when the magnitude of the armature magnetic flux is zero or more, and off when the magnitude of the armature magnetic flux is less than zero. Here, the ON signal indicates the N pole. Further, the sinusoidal wave of the permanent magnet magnetic flux is detected at the Hall sensor installed on the Hall sensor PCB (Print Circuit Board), and it is converted to an on/off signal δH representing the magnitude of the permanent magnet magnetic flux. That is, the sinusoidal wave is converted to a signal which becomes on when the magnitude of the permanent magnet magnetic flux is zero or more, and off when the magnitude of the permanent magnet magnetic flux is less than zero. Here, the ON signal indicates the S pole. In the present embodiment, both OD and OH are made to be 50% duty on/off signals.

In FIG. 23, the sinusoidal wave table position means the table position of FIG. 3. Thus, in one wavelength (one period) of the drive frequency, the PCWM signal encoder outputs 720 pulses as the counting signal. For example, as a result of digital measurement, if the phase difference (measured load angle δL) between the armature magnetic flux and the permanent magnet magnetic flux is 36 of the above-described pulses, this is 5% (=36/720) of the wavelength, and therefore the measured load angle δL is 18° (=360°×0.05).

When the number of rotations of the drive motor is given, there exists the load angle value which gives optimum efficiency for the varying load magnitude. A model follower adaptive control method is employed by adjusting the motor applied voltage to have the value of the counted load angle become the ideal value stored in the table. For this purpose, a load test is conducted on the motor in advance, to get the table shown in FIG. 17. The relationship between the voltage command VC and the target load angle δT shown in FIG. 17 is prepared for each of the certain frequency ranges, and stored in the target load angle table 104. Thus, the target load angle table 104 stores the target load angle (OT) to be targeted for the frequency (FC) and the voltage (VC) applied to the permanent magnet motor 64.

If the present load angle measurement system is likened to measurement of the passing time of a train passing at a railroad crossing, it resembles conducting fixed point observation of the time difference from the closing of the crossing gate to the arrival of the train. That is, measurement of the delay time of the permanent magnet magnetic flux axis from the armature magnetic flux axis is understood as the phase difference between the respective pulse trains of the armature magnetic flux and the permanent magnet magnetic flux which have been converted to 50% duty.

Figure 24:
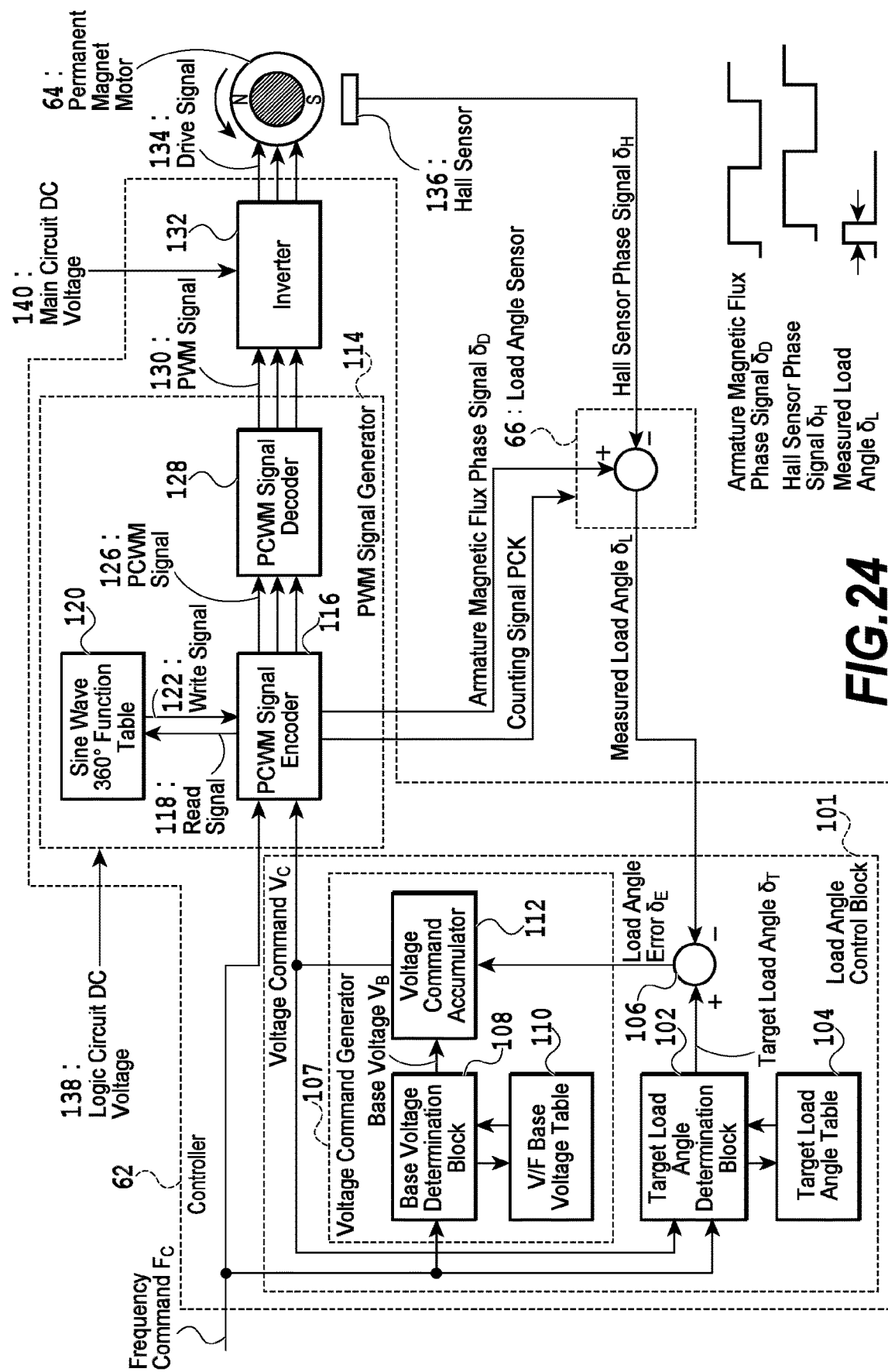
FIG. 24 is a detailed block diagram showing how a control system is mechanized using a load angle as the primary controlled variable according to one embodiment of the present disclosure.

By referring to FIG. 24 which shows one embodiment of the load angle control, further detailed explanation will be given. FIG. 24 specifically shows the constitution of the permanent magnet motor drive system 60 of the present embodiment shown in FIG. 15.

In the present embodiment, the load angle sensor 66 and the load angle control block 101 perform the load angle measurement and control. However, as described previously, the load angle measurement and control are not always done during the entire motor drive. They are performed within certain motor speed ranges in which the motor enters into steady operation.

The load angle control block 101 generates the voltage command VC based on the frequency command FC and the measured load angle δL to control the load angle.

The frequency command FC supplied from the outside of FIG. 24, and the voltage command VC which is calculated on real time inside the figure and described later, are input to a target load angle determination block 102 inside the load angle control block 101. The target load angle determination block 102 determines the target load angle δT based on the frequency command FC and the voltage command VC by referring to the target load angle table 104. The target load angle table 104 is a set of values of load angles at which the efficiency becomes optimal, and which are obtained by conducting load test on the motor in advance. The target load angle table 104 is given in the format shown in FIG. 17 as described previously.

The load angle sensor 66 in FIG. 24 subtracts the Hall sensor phase signal (signal representing the phase of the Hall sensor, i.e., phase of the permanent magnet magnetic flux) OH output from the Hall sensor 136, from the armature magnetic flux phase signal (signal representing the phase of the armature magnetic flux) OD output from the PCWM signal encoder 116, which is described later, to obtain the measured load angle δL as the output.

The load angle sensor 66 outputs the measured load angle δL of which measurement is made by the method described in FIG. 23. The load angle sensor 66 may output the measured load angle δL after averaging it. The measured load angle δL output from the load angle sensor 66 is then input to a load angle error calculator 106.

The load angle error calculator 106 subtracts the measured load angle δL from the target load angle δT to obtain a load angle error δE. The load angle error δE is input to a voltage command accumulator 112 inside a voltage command generator 107.

The voltage command generator 107 generates a voltage command VC. The voltage command generator 107 comprises a base voltage determination block 108, a V/F base voltage table 110, and the voltage command accumulator 112.

Figure 25:
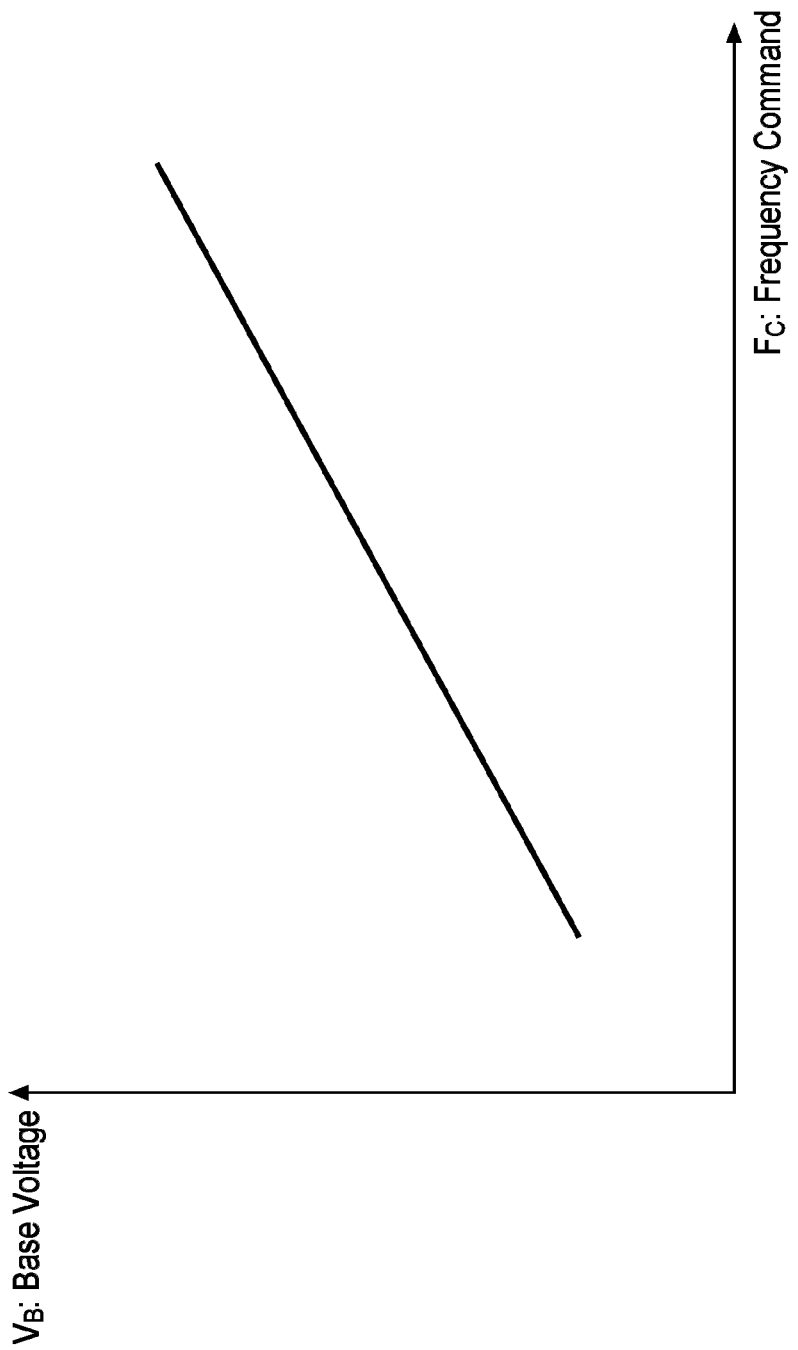
FIG. 25 is a chart showing relation of base voltage vs. frequency command as shown in FIG. 24 according to one embodiment of the present disclosure.

The frequency command FC is input to the base voltage determination block 108. The base voltage determination block 108 determines a base voltage VB by referring to the V/F base voltage table 110. The V/F base voltage table 110 is a one obtained by conducting a load test on the motor in advance, and given in the format shown in FIG. 25. The base voltage VB output from the base voltage determination block 108, is input to the voltage command accumulator 112 having an addition/subtraction/storage function.

At the time of entering into the load angle measurement and control loop, the voltage command accumulator 112 outputs the base voltage VB as the initial value of the voltage command VC, to the target load angle determination block 102 and the PCWM encoder 116. Thereafter, the voltage command accumulator 112 receives the load angle error δE from the load angle error calculator 106, and adjusts the voltage command VC based on the load angle error δE. Specifically, when the load angle error δE is plus, it means the measured load angle is less than the target load angle. Therefore, it works so that the voltage command VC is decreased. Contrary, when the load angle error δE is minus, it means the measured load angle is more than the target load angle. Therefore, it works so that the voltage command VC is increased.

On the other hand, at the time of exiting from the load angle measurement and control loop, the voltage command accumulator 112 continues to renew the value held by itself toward the value of the base voltage VB so that the held value matches the base voltage VB in the end.

A PWM signal generator 114 comprises the PCWM signal encoder 116, a PCWM signal decoder 128, and a sine wave 360° function table 120. For example, the PWM signal generator 114 can be realized as an LSI or an ASIC. A logic part DC voltage 138 is supplied to the PWM signal generator 114. The PWM signal generator 114 generates a PWM signal based on the frequency command FC and the voltage command VC.

Figure 2:
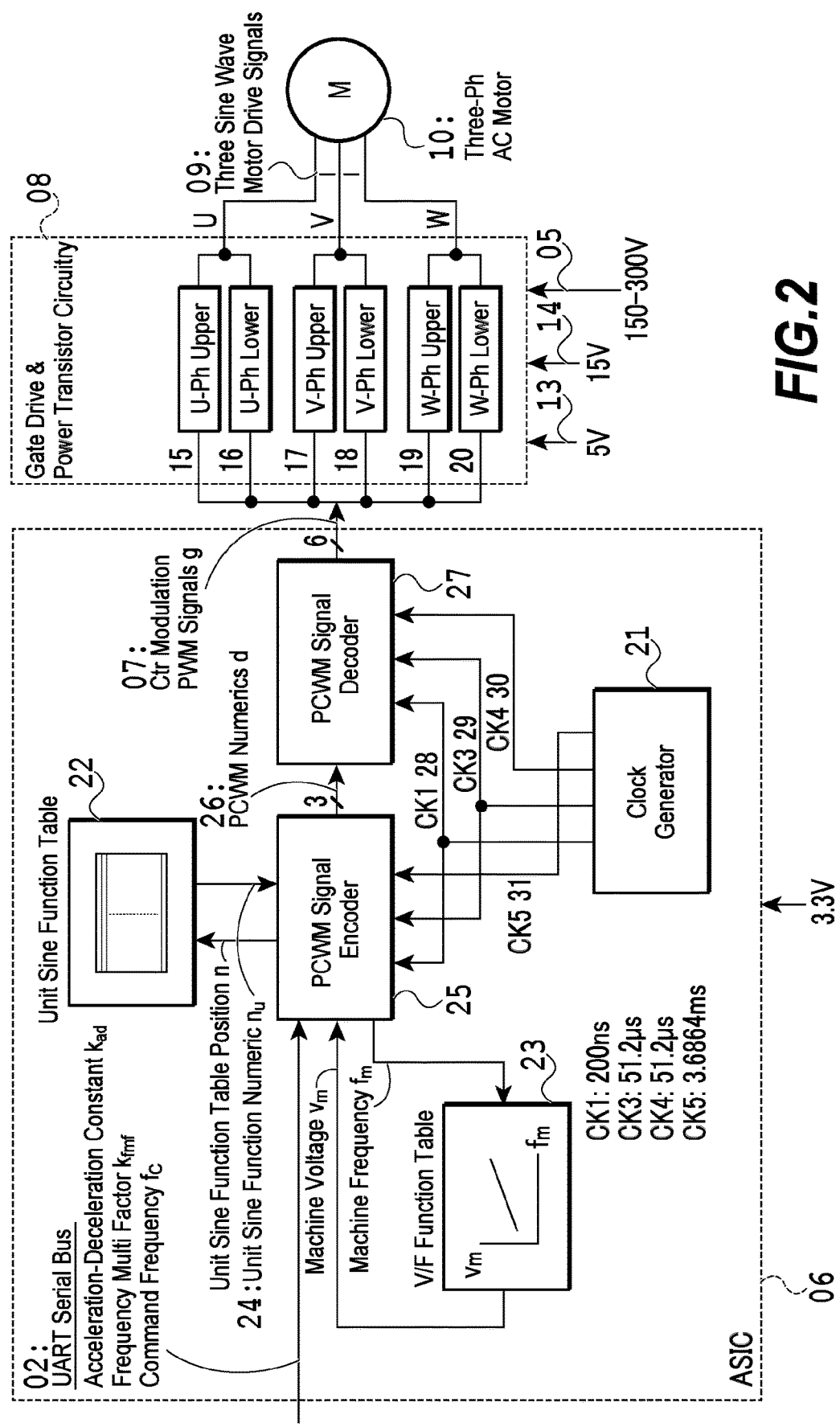
FIG. 2 is a block diagram showing the detailed inside embodiment of an ASIC and a gate drive and power transistor circuitry according to one embodiment of the prior patent invention.
Figure 6:
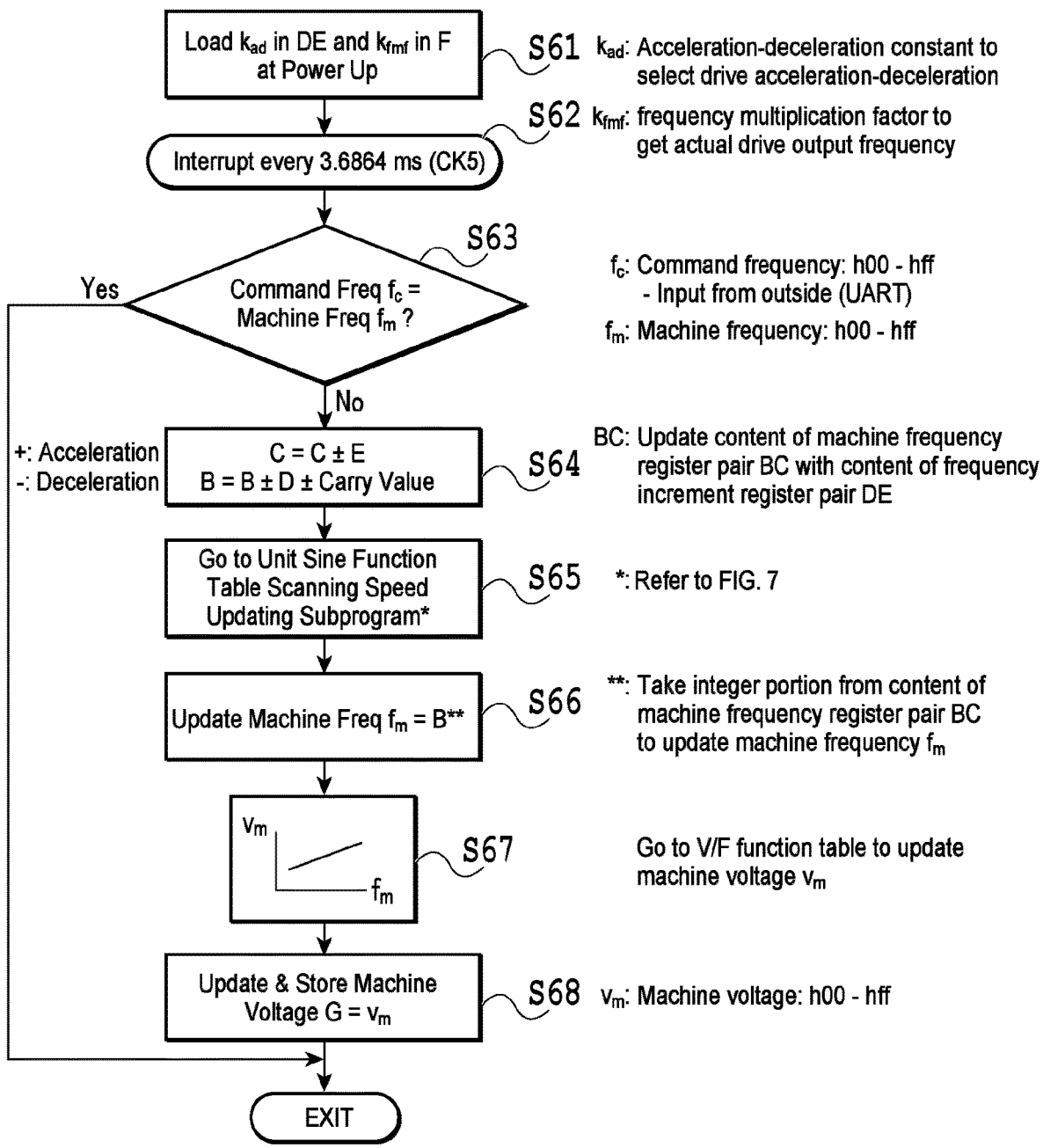
FIG. 6 is a flow chart of a subprogram showing how a machine frequency and a machine voltage are updated every CK5 interrupt period (approximately 3.6864 ms) according to one embodiment of the prior patent invention.
Figure 8:
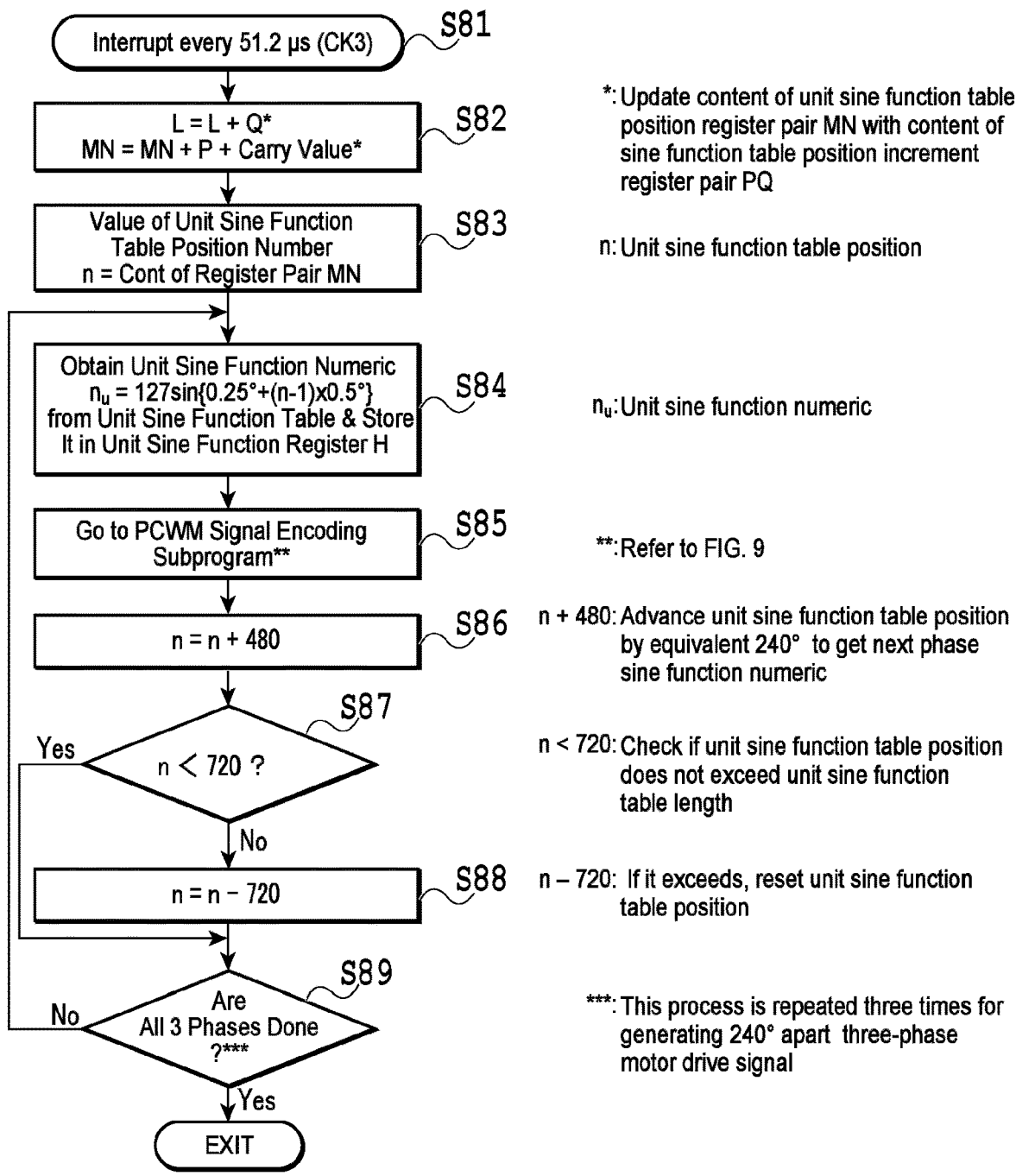
FIG. 8 is a flow chart of a subprogram showing how a unit sine function table position number is updated every CK3 interrupt period (51.2 µs) according to one embodiment of the prior patent invention.
Figure 10:
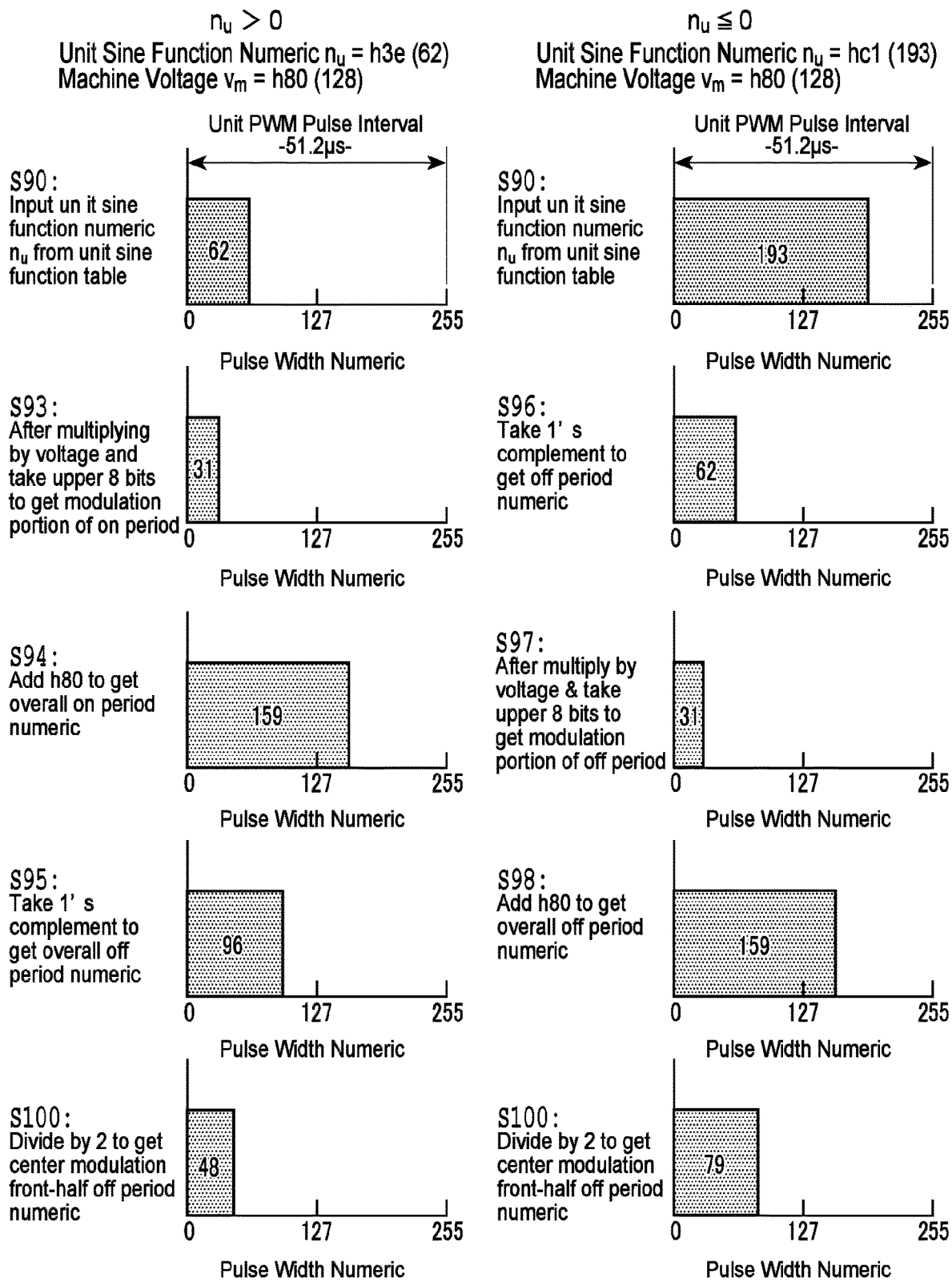
FIG. 10 is a time chart illustrating how PCWM numerics generated in the PCWM signal encoder are converted into a pulse width numeric in the unit PWM pulse interval in the PCWM signal encoder according to one embodiment of the prior patent invention.
Figure 11:
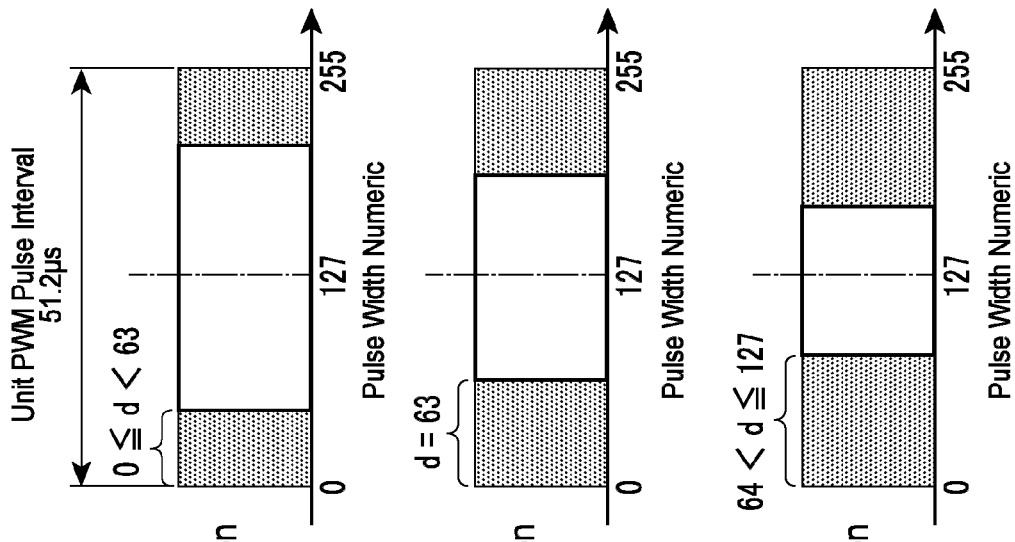
FIG. 11 is a comparison chart for the PCWM signal decoder output waveforms illustrating how the side modulation and the center modulation upper arm signals look in the unit PWM pulse interval according to one embodiment of the prior patent invention.
Figure 12:
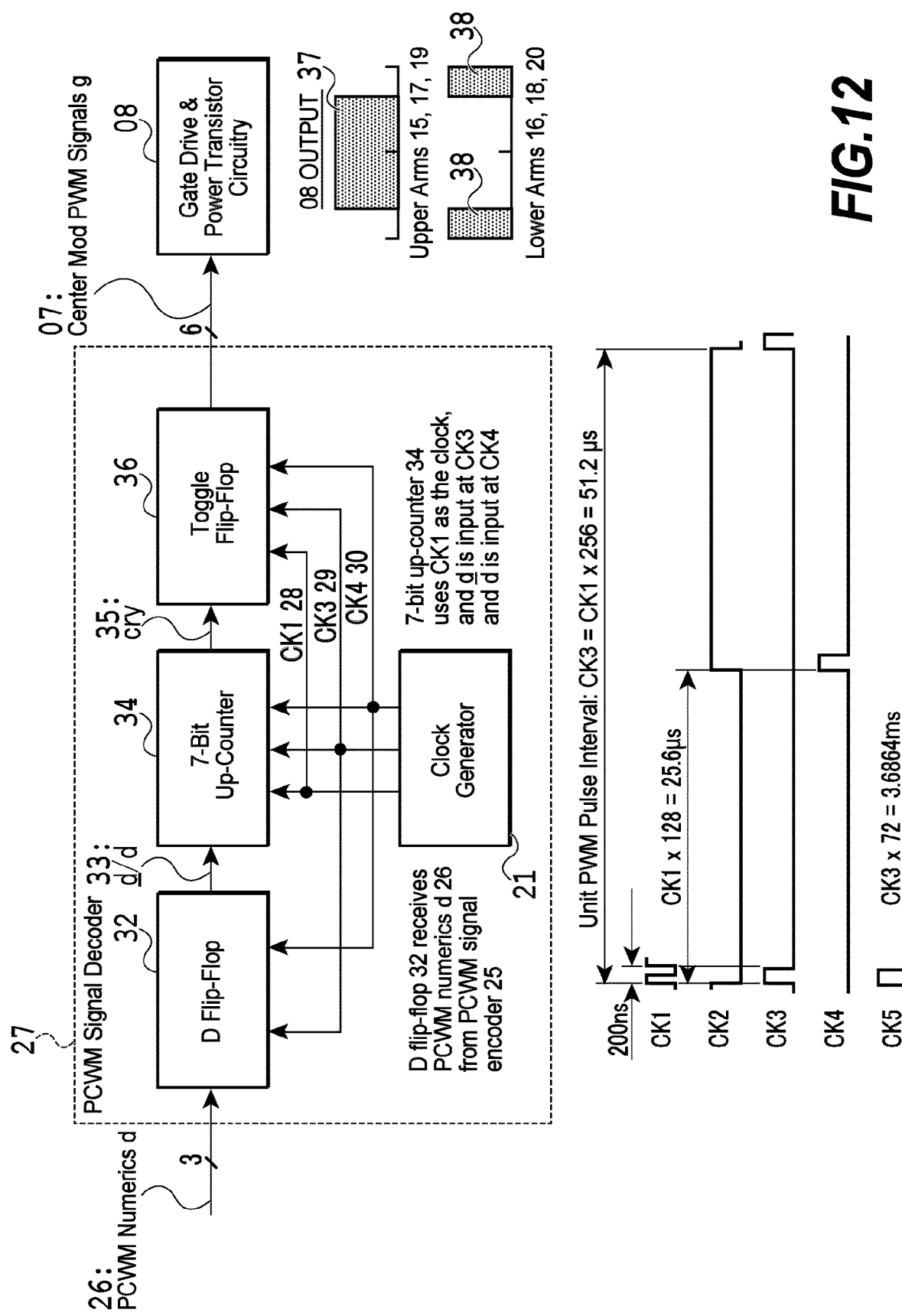
FIG. 12 is a block diagram showing the detailed inside of the PCWM signal decoder in the ASIC according to one embodiment of the prior patent invention.
Figure 13:
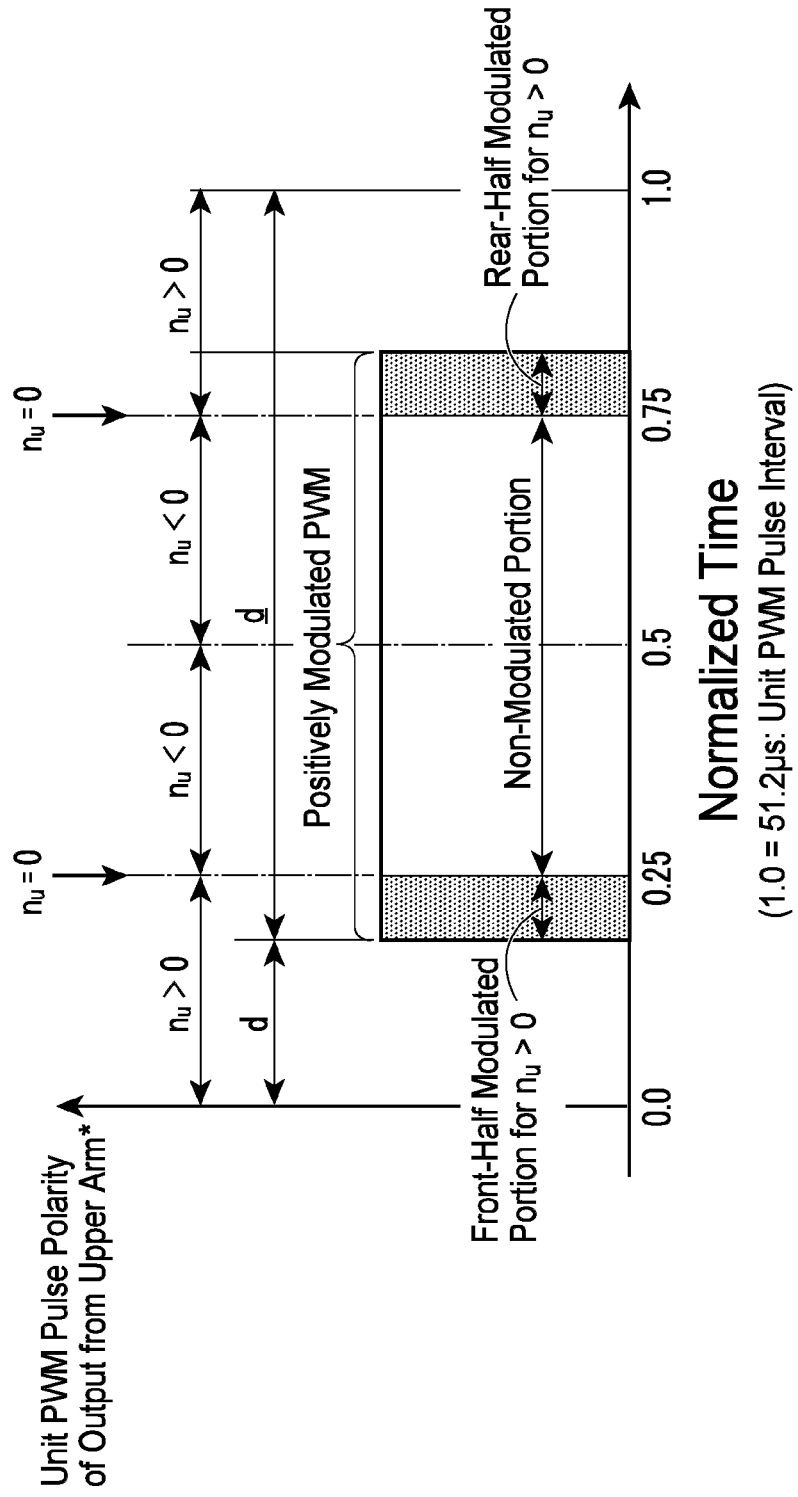
FIG. 13 illustrates an example a unit PWM pulse polarity characteristic for the upper a arms' signal when the unit sine function is positive as a function of the normalized time in the unit PWM signal interval according to one embodiment of the prior patent invention.
Figure 14:
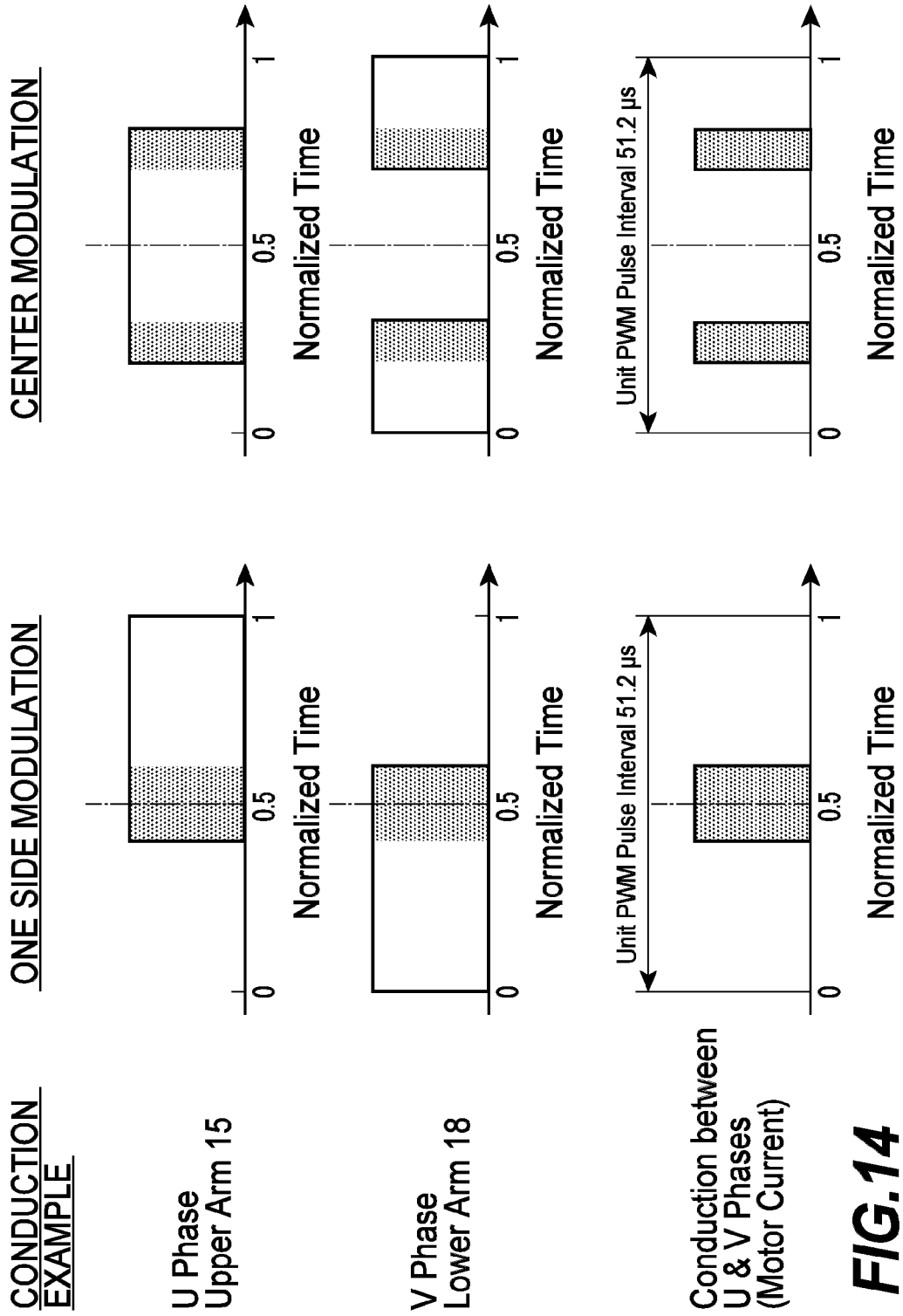
FIG. 14 is a comparison chart showing that center modulation PWM signal can create the power transistors' inter-conduction twice per each unit PWM pulse interval by one on/off operation of each power transistor in the compared to once for a side modulation PWM signal according to one embodiment of the prior patent invention.

Here, the PWM signal generator 114 can be configured similarly to the ASIC 06 shown in FIGS. 1 and 2. However, in the present embodiment, the clocks CK1, CK3, CK4 and CK5 shown in FIG. 2 have been made eight times greater. That is, CK1, CK3, CK4 and CK5 have been made to be 1.6 μs, 409.6 μs, 409.6 μs and 29.4912 ms, respectively. Further, until the machine frequency FM reaches the frequency command (command frequency) FC, the process shown in FIG. 6 is conducted, and load angle control is not conducted. After the machine frequency FM reaches the frequency command (command frequency) FC, the voltage command VC is input as a machine voltage VM to the PCWM signal encoder 116, and load angle control is conducted.

The PCWM signal encoder 116 receives the frequency command FC and the voltage command VC as inputs, and receives data stored in the sine wave 360° function table 120 shown in FIG. 3 as a write signal 122 by a read signal 118 of a prescribed period. The PCWM signal encoder 116 outputs an encoded PCWM signal 126 by real time processing the write signal 122 and the information of the frequency command FC and the voltage command VC.

The format of the sine wave 360° function table 120 is the same as the unit sine function table in FIG. 3. The table consists of 720 8-bit binary signals. 720 is selected as a multiple of 6. In the present embodiment, a three phase permanent magnet type motor is used, and therefore it is preferable to select a multiple of 6.

Figure 4:
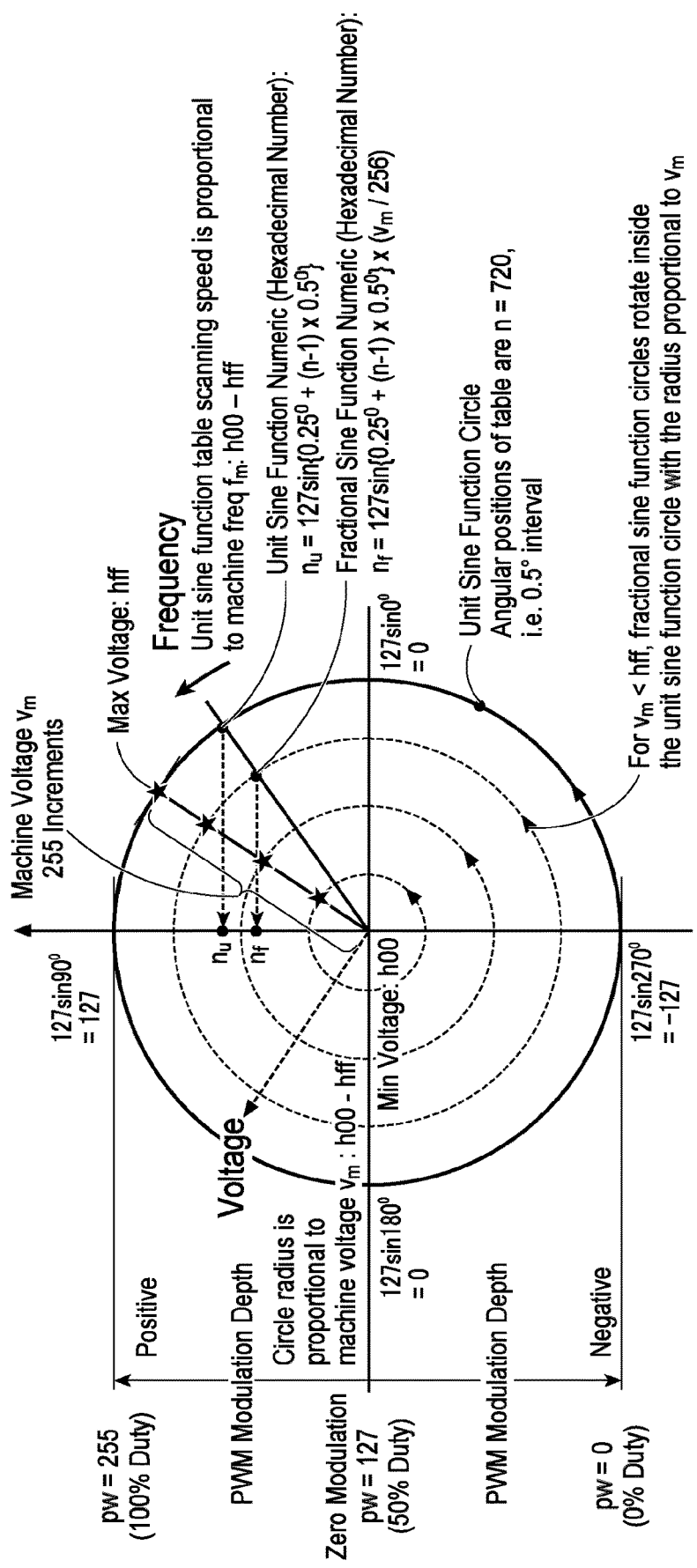
FIG. 4 is an illustration showing a relation between the instantaneous amplitude value of the fractional sine function and the pulse width numeric in the unit PWM pulse interval according to one embodiment of the prior patent invention.

A figure showing how the information of the sine wave 360° function table 120 is processed in the PCWM signal encoder 116, is the fractional sine function numeric nf representing the instantaneous amplitude value and the pulse width numeric pw of FIG. 4. It shows that after the inverter starts at the origin of the circle, the scanning speed increases with the operation point moving toward the outside as it is accelerated, and when it reaches the maximum speed, the operation point circulates on the outer periphery of the circle.

Figure 5:
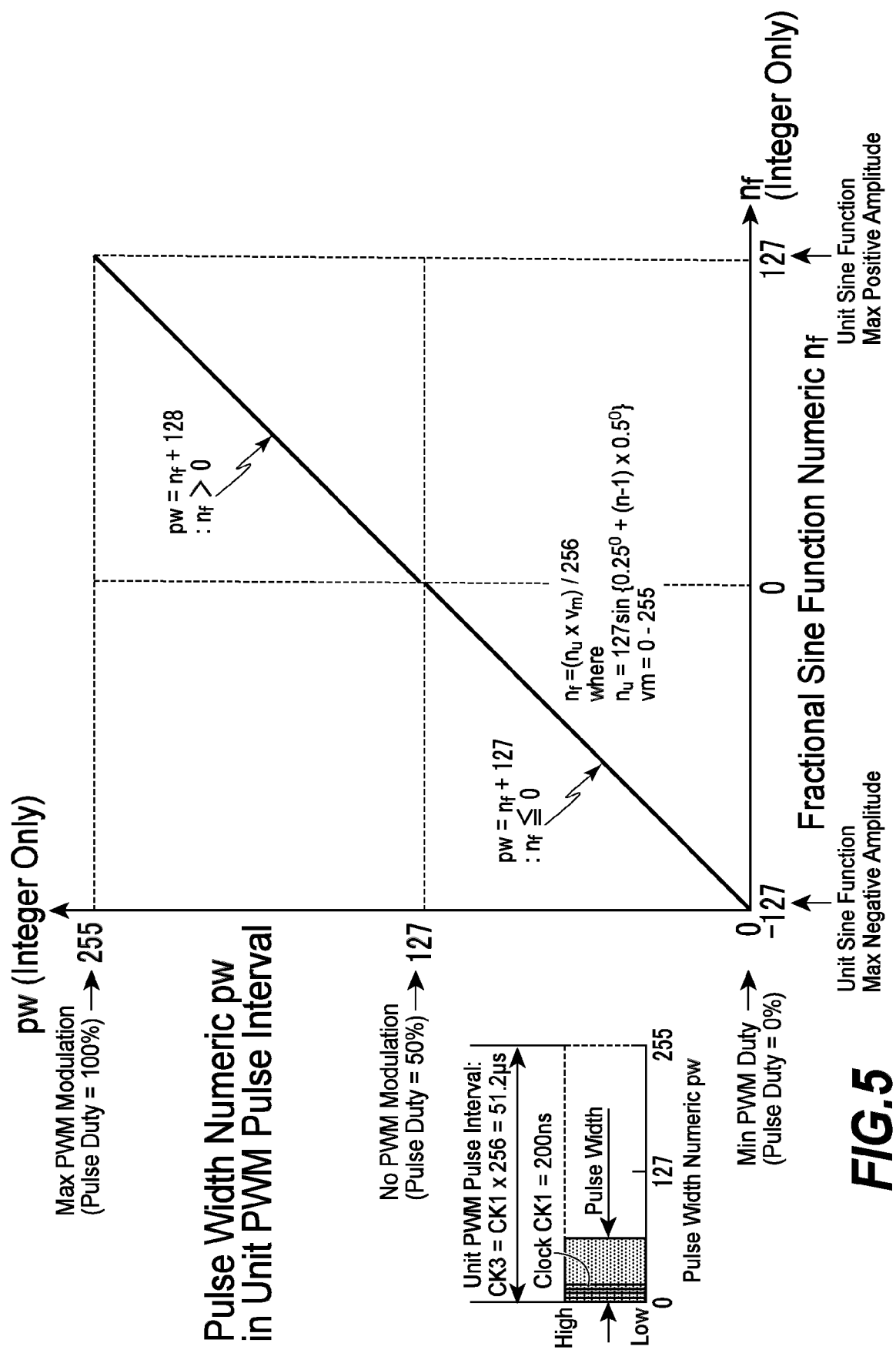
FIG. 5 is a functional relation graph between the pulse width numeric in the unit PWM pulse interval and the fractional sine function numeric according to one embodiment of the prior patent invention.

A figure showing how the fractional sine function numeric nf in FIG. 4 is converted to the pulse width numeric pw, is the relationship between the pulse width numeric pw and the fractional sine function numeric nf of FIG. 5. However, as described above, in the present embodiment, CK1 and CK3 are made as 1.6 μs and 409.6 μs, respectively.

As shown in the left side of FIG. 5, based on the calculation formula shown in FIG. 5, the encoded pulse width numeric pw in the unit PWM pulse interval is obtained, and this is output as the PCWM signal 126.

The PCWM signal decoder 128 decodes the PCWM signal 126 input from the PCWM signal encoder 116 on real time as a PWM signal 130, and outputs it to the inverter (gate drive) 132 of the next stage. The decoding method of the PCWM signal decoder 128 is described previously with reference to FIGS. 10-14.

The inverter 132 generates a motor drive signal 134 based on the PWM signal 130. The inverter 132 can be configured similarly to the gate drive and power transistor circuitry 08 shown in FIGS. 1 and 2. The motor drive signal 134 output from the inverter 132 drives the three phase permanent magnet motor 64 which is directly coupled to the load 70. A main circuit DC voltage 140 is supplied to the inverter 132.

The controller 62 applies the voltage to the permanent magnet motor 64, and therefore it knows the state of the armature magnetic flux at each time. The PCWM signal encoder 116 of the controller 62 outputs, among its outputs, the armature magnetic flux phase signal δD which is an on/off signal of 50% duty representing the magnitude (zero or more, or less than zero) of the sine wave signal of the armature magnetic flux.

In the case of FIG. 24, the Hall sensor 136 is installed on the stator side of the three phase permanent magnet motor 64 (see also FIG. 23). The Hall sensor 136 detects the sine wave signal generated by the rotation of the three phase permanent magnet motor 64, converts the signal to the Hall sensor phase signal δH which is an on/off signal of 50% duty representing the magnitude (zero or more, or less than zero) of the signal by a comparator in the Hall sensor 136, and outputs it.

The PCWM signal encoder 116 outputs the counting signal (read signal) PCK which becomes on/off at every occurrence of the write signal 122. The counting signal PCK outputs as many pulses as the number of data stored in the sine wave 360° function table 120 during one period of the drive frequency signal regardless of the magnitude of the drive frequency. This can be called the second carrier which is synchronized to the period of the drive frequency. When the phase difference between the armature magnetic flux phase signal δD and the Hall sensor phase signal δH is digitally measured, the phase difference becomes an effective means as an index showing the ratio to the wavelength of the drive frequency signal.

The load angle sensor 66 receives the armature magnetic flux phase signal OD and the Hall sensor phase signal δH as inputs, counts the phase difference between the two by the counting signal PCK, and outputs the resulting number of counts as the measured load angle M.

In this way, it is possible to count digitally what percentage of the wavelength at the current drive frequency the magnitude of the load angle becomes. Namely, the inverter 132 of the controller 62 applies the sine wave voltage to the permanent magnet motor 64. Further, the phase of the voltage is expressed in n=720 ways (see FIGS. 3 and 4). Further, the PCWM signal encoder 116 of the controller 62 sends n=720 counting signals PCK (pulses) to the load angle sensor 66 during one period (one wavelength) of the voltage. Then, the load angle sensor 66 measures the load angle by measuring the number of pulses which corresponds to the phase difference between the armature magnetic flux and the permanent magnet magnetic flux corresponds to. Thus, the load angle sensor 66 can count digitally what percentage of the wavelength at the current drive frequency the magnitude of the load angle becomes.

In the present embodiment, the phase of the voltage is expressed in n=720 ways. However, another value (integer equal to or greater than 2) can be employed as n. Here, as the value of n, 6 or more is preferable. Specifically, a multiple of 6 which is 6 or more is preferable.

Further, in the present embodiment, a Hall sensor is used as a permanent magnet magnetic flux sensor detecting the permanent magnet magnetic flux, but another permanent magnet magnetic flux sensor may be used.

Second Embodiment

In the above-described first embodiment, control is conducted based on load angle, but in the second embodiment of the present disclosure, control is conducted based on power factor angle.

Figure 26:
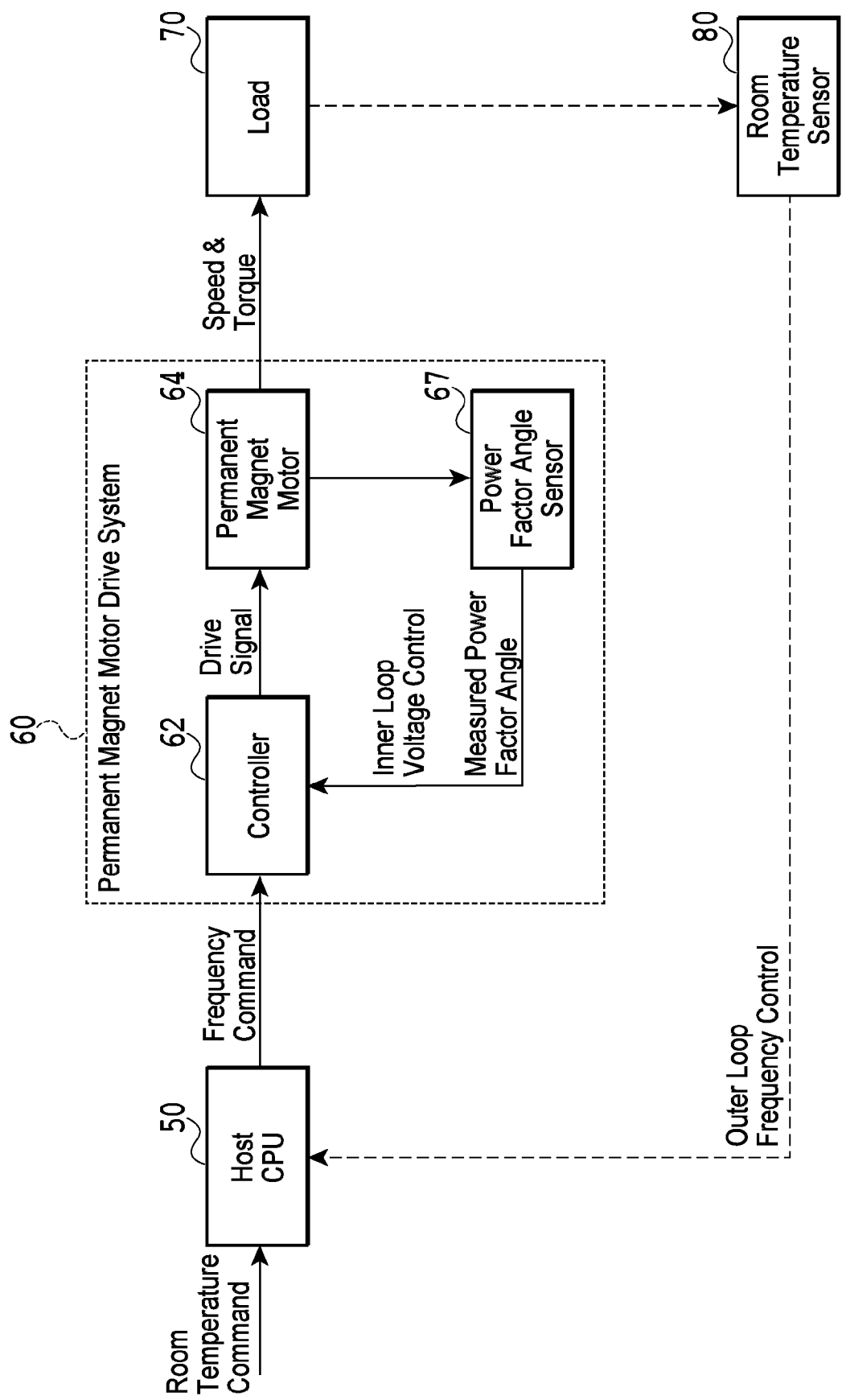
FIG. 26 is a block diagram showing an alternate motor drive feedback control system using a power factor angle as the primary controlled variable according to another embodiment of the present disclosure.

FIG. 26 illustrates a permanent magnet motor drive system (synchronous motor drive system) in the second embodiment of the present disclosure, and represents a circuit block diagram for an efficiency control of either an air conditioner or a fan. The permanent magnet motor drive system 60 of the present embodiment comprises a controller 62, a permanent magnet motor 64, and a power factor angle sensor 67. In the present embodiment, as a load 70, for example, an air conditioner or a fan is assumed. When a user inputs a room temperature command to a host CPU 50, the host CPU 50 inputs a frequency command which depends on the room temperature command, to the controller 62 inside the permanent magnet motor drive system 60. The controller 62 generates a drive signal which depends on the frequency command, and supplies it to the permanent magnet motor 64. The permanent magnet motor 64 operates in accordance with the drive signal, and supplies a speed and a torque to the load 70. The load (air conditioner or fan) 70 operates in accordance with the speed and the torque, and the room temperature changes.

In the present embodiment, a power factor angle is controlled by regulating a voltage in an inner loop. That is, the power factor angle sensor 67 measures the power factor angle of the permanent magnet motor 64, and supplies it to the controller 62. The controller 62 generates the drive signal based on the frequency command and the measured power factor angle. Here, for the number of rotations of the permanent magnet motor 64, in accordance with the magnitude of the load, there exists the value of the power factor angle (target power factor angle) at which the efficiency of the permanent magnet motor 64 becomes optimal. The controller 62 generates the drive signal by controlling (adjusting) the applied voltage independently of the applied frequency so that the supplied measured power factor angle approaches the target power factor angle, and thereby the optimal efficiency can be achieved.

Further, in the present embodiment, frequency control is conducted in an outer loop. That is, a room temperature sensor 80 measures the room temperature, and supplies it to the host CPU 50. The host CPU 50 controls (adjusts) the frequency command in accordance with the supplied room temperature.

Further, it is noted that a compressor, etc. may be employed as the load 70.

Figure 27:
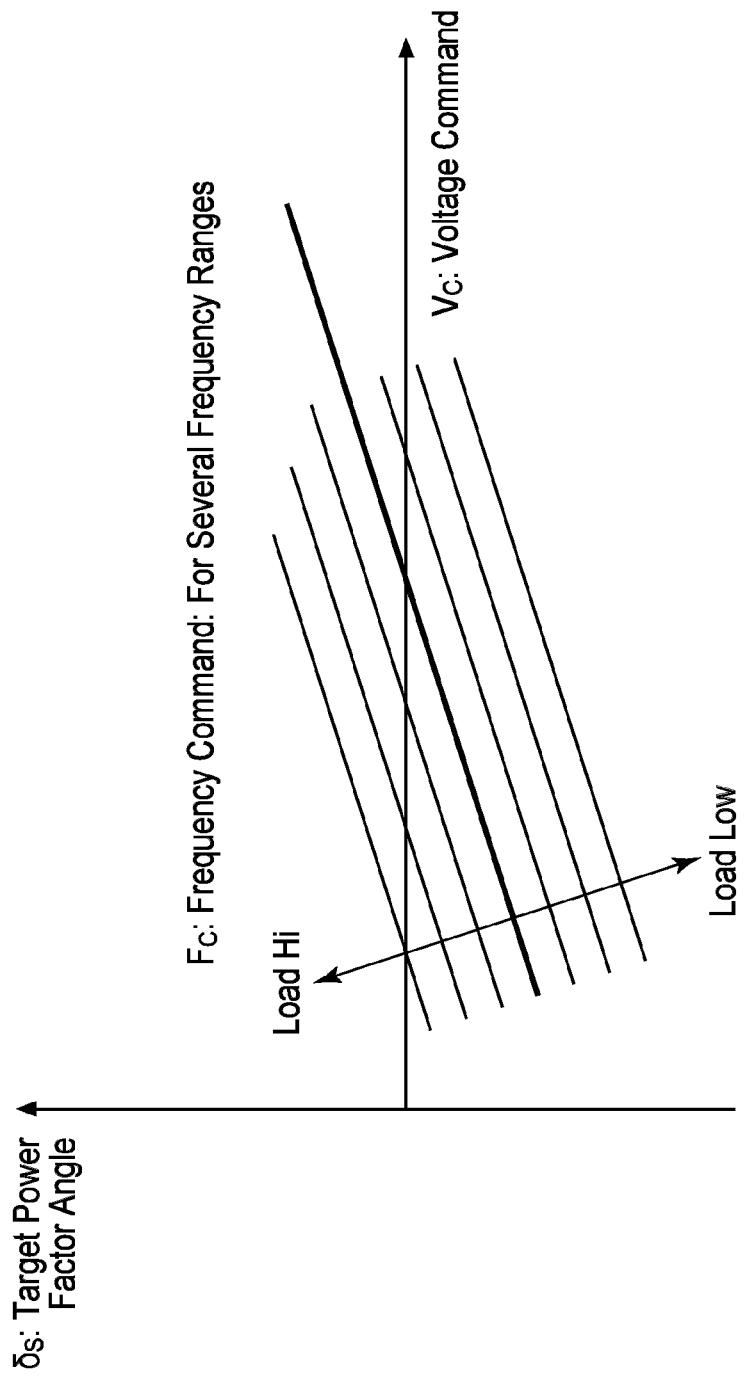
FIG. 27 is a chart of power factor angle vs. voltage command with load levels as the parameter for certain frequency ranges obtained by a load test according to another embodiment of the present disclosure.

FIG. 27 is a diagram showing one example of an optimal efficiency data table obtained as a result of conducting a load test on a motor. We will explain this further later.

The power factor angle measurement and control of the present embodiment are not always executed during the entire motor drive. They are operational within a certain motor speed range in which the motor has entered into steady operation. For the motor drive in a transient state of increasing or decreasing the speed of the motor, an open loop control is executed by fully utilizing the character of a PCWM scheme employed by the present embodiment. The frequency of the power factor angle measurement and control of the present embodiment may be control of an extremely long interval such as on a "minute" basis. However, at the time of detecting the power factor angle, real time processing of a short interval by a counting signal PCK output from the PCWM signal encoder, described later, is preferable.

A 24-poles/18-slots external rotor type motor is preferable for practical use. A method for measuring the motor power factor angle for such motor will be explained by using FIGS. 28 and 29 which show one embodiment.

The measurement of the motor power factor angle is conducted by measuring the phase difference between a terminal voltage (In the present embodiment, the U phase terminal voltage is used as a representative of the three phases.) of the motor and a terminal current (In the present embodiment, the U phase terminal current is used as a representative of the three phases.) of the motor. Terminals of the motor and terminals of an inverter are connected each other. Therefore, the terminal voltage and the terminal current of the motor are identical to the terminal voltage and the terminal current of the inverter, respectively. In the present embodiment, a current sensor 144 detects the terminal current of the inverter, and thereby the terminal current of the motor is detected. Specifically, the measurement of the motor power factor angle is made by converting the sine wave of each of the terminal voltage and the terminal current to 50% duty on/off signal, and measuring the phase difference between the signals after the conversion. Thereby, an ND converter for measuring an amplitude becomes unnecessary, and a signal processing circuit which is tolerant to external noises can be realized. Further, in contrast with the first carrier (CK3 described later) used in the PCWM scheme which has a constant frequency, the period of the sine wave of the voltage applied to the motor changes in accordance with a drive frequency, and therefore by using the second carrier (the counting signal PCK described later) which is synchronized to the sine wave frequency, what percentage of the wavelength at the current drive frequency the magnitude of the power factor angle becomes, is digitally counted.

Figure 28:
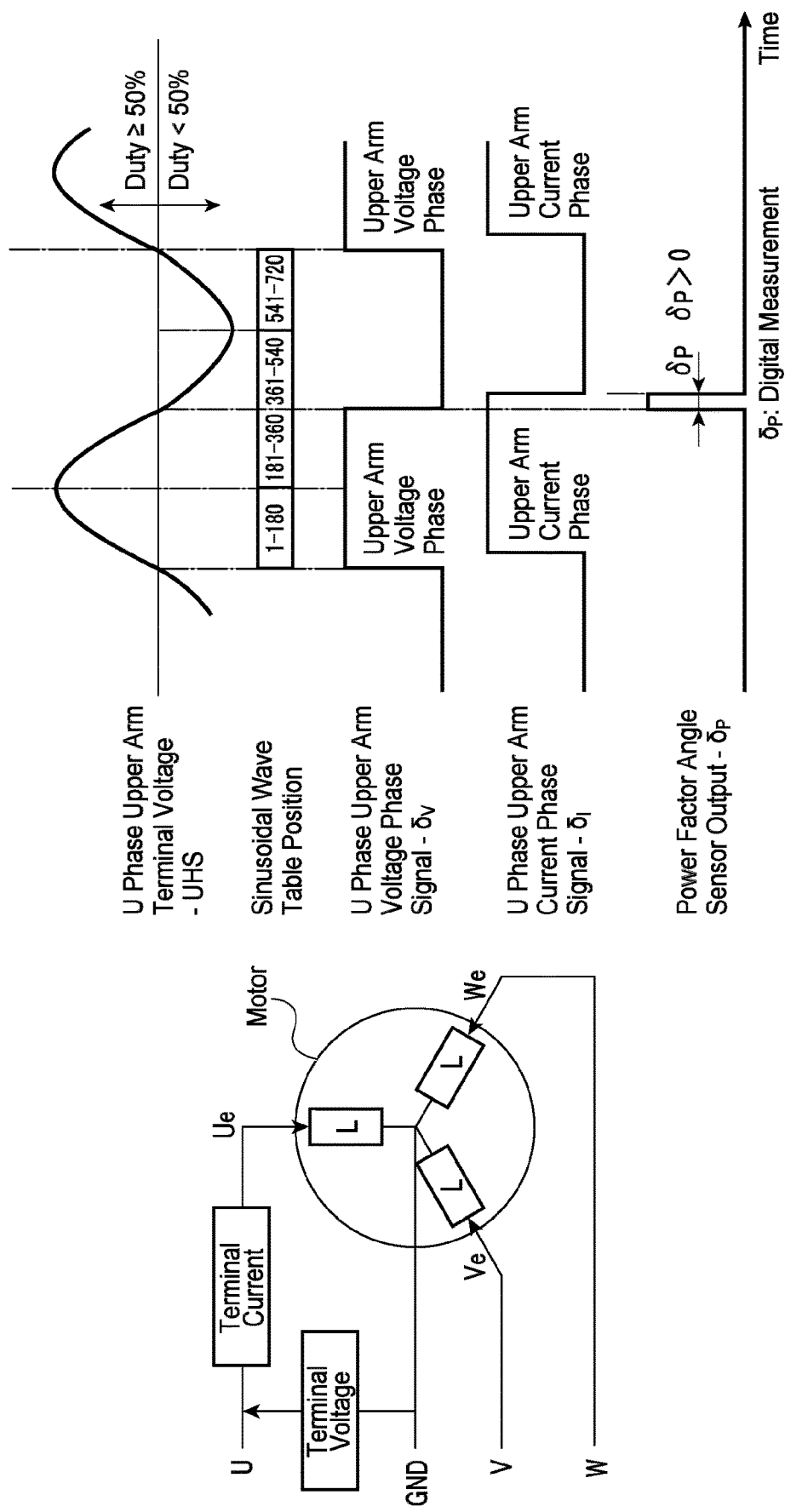
FIG. 28 is a control diagram when a voltage phase is advanced from a current phase and the associated time chart showing how the control is mechanized using the power factor as a controlled variable according to another embodiment of the present disclosure.
Figure 29:
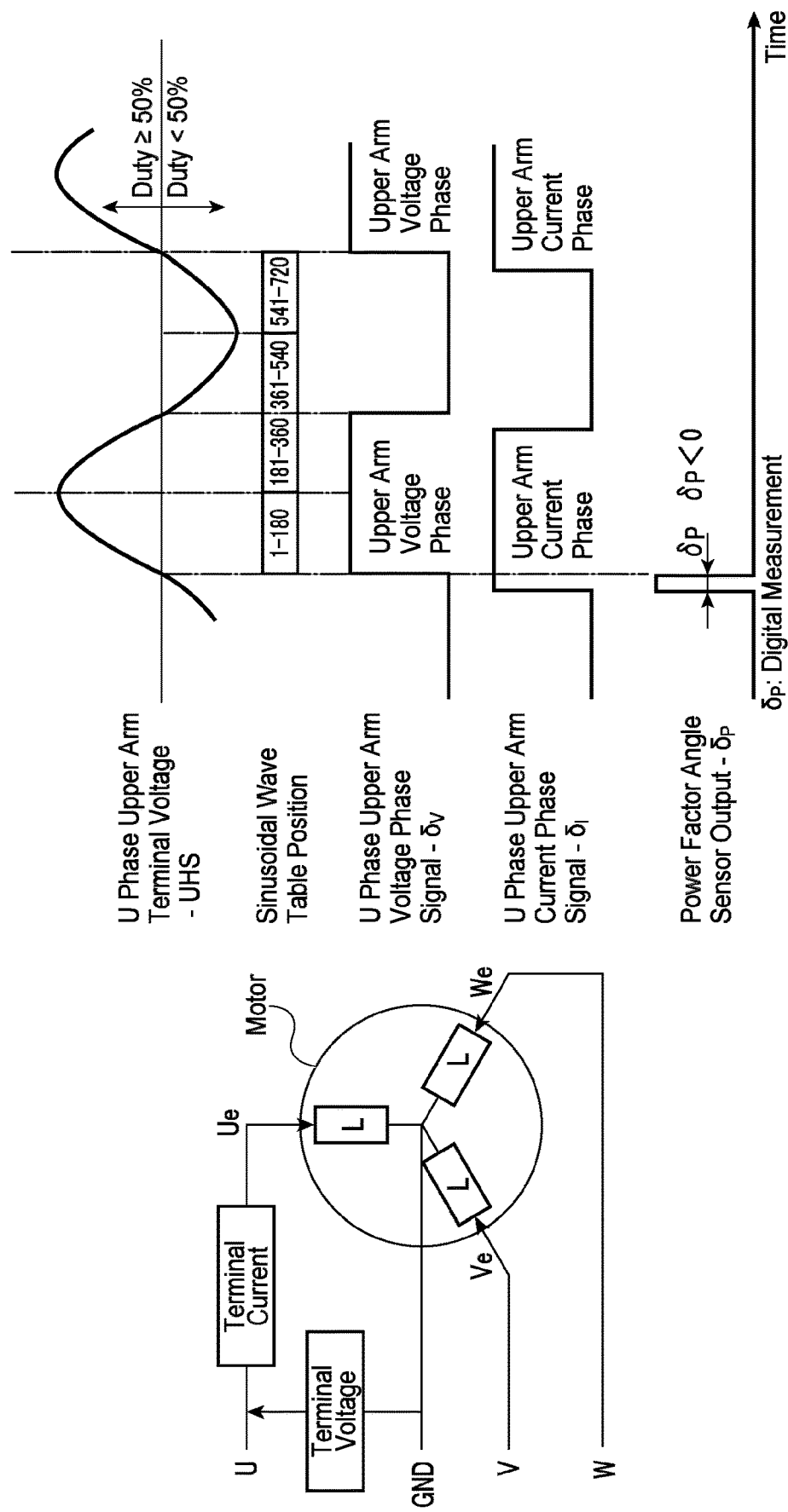
FIG. 29 is a control diagram when a voltage phase is delayed from a current phase and the associated time chart showing how the control is mechanized using the power factor as a controlled variable according to another embodiment of the present disclosure.

In FIGS. 28 and 29, the sine wave of the terminal voltage is converted to an on/off signal δV representing the magnitude of the terminal voltage. The conversion is conducted inside a PCWM signal encoder 116, which is described later. That is, the sine wave is converted to a signal which becomes on when the magnitude of the terminal voltage is zero or more, and off when the magnitude of the terminal voltage is less than zero. Secondly, the sine wave of the terminal current is converted to an on/off signal δI representing the magnitude of the terminal current. The conversion is conducted inside the current sensor 144, which is described later. That is, the sine wave is converted to a signal which becomes on when the magnitude of the terminal current is zero or more, and off when the magnitude of the terminal current is less than zero. In the present embodiment, both δV and δI are made to be 50% duty on/off signals.

FIG. 28 shows a case where the voltage phase is advanced from the current phase. In FIG. 28, the sinusoidal wave table position is identical to the table position of FIG. 3. Thus, in one wavelength (one period) of the drive frequency, the PCWM signal encoder outputs 720 pulses as the counting signal. For example, as a result of digital measurement, if the phase difference (measured power factor angle δP) between the voltage phase and the current phase is 36 of the above-described pulses, this is 5% (=36/720) of the wavelength, and therefore the measured power factor angle δP is 18° (=360°×0.05).

FIG. 29 shows a case where the voltage phase is delayed from the current phase. In FIG. 29, the sinusoidal wave table position is identical to the table position of FIG. 3. Thus, in one wavelength (one period) of the drive frequency, the PCWM signal encoder outputs 720 pulses as the counting signal. For example, as a result of digital measurement, if the phase difference (measured power factor angle δP) between the voltage phase and the current phase is 36 of the above-described pulses, this is 5% (=36/720) of the wavelength, and therefore the measured power factor angle δP is −18° (=−360°×0.05).

There exists the power factor angle value at which the efficiency becomes optimal for the varying load magnitude at the given number of rotations of the drive motor. A model follower adaptive control method is employed by adjusting the motor applied voltage to have the value of the counted power factor angle become the ideal value stored in the table. For this purpose, a load test is conducted on the motor in advance, to get the table shown in FIG. 27. The relationship between the voltage command VC and the target power factor angle δS shown in FIG. 27 is prepared for each of the certain frequency ranges, and stored in the target power factor angle table 105. Thus, the target power factor angle table 105 stores the target power factor angle (OS) to be targeted for the frequency (FC) and the voltage (VC) applied to the permanent magnet motor 64.

Figure 30:
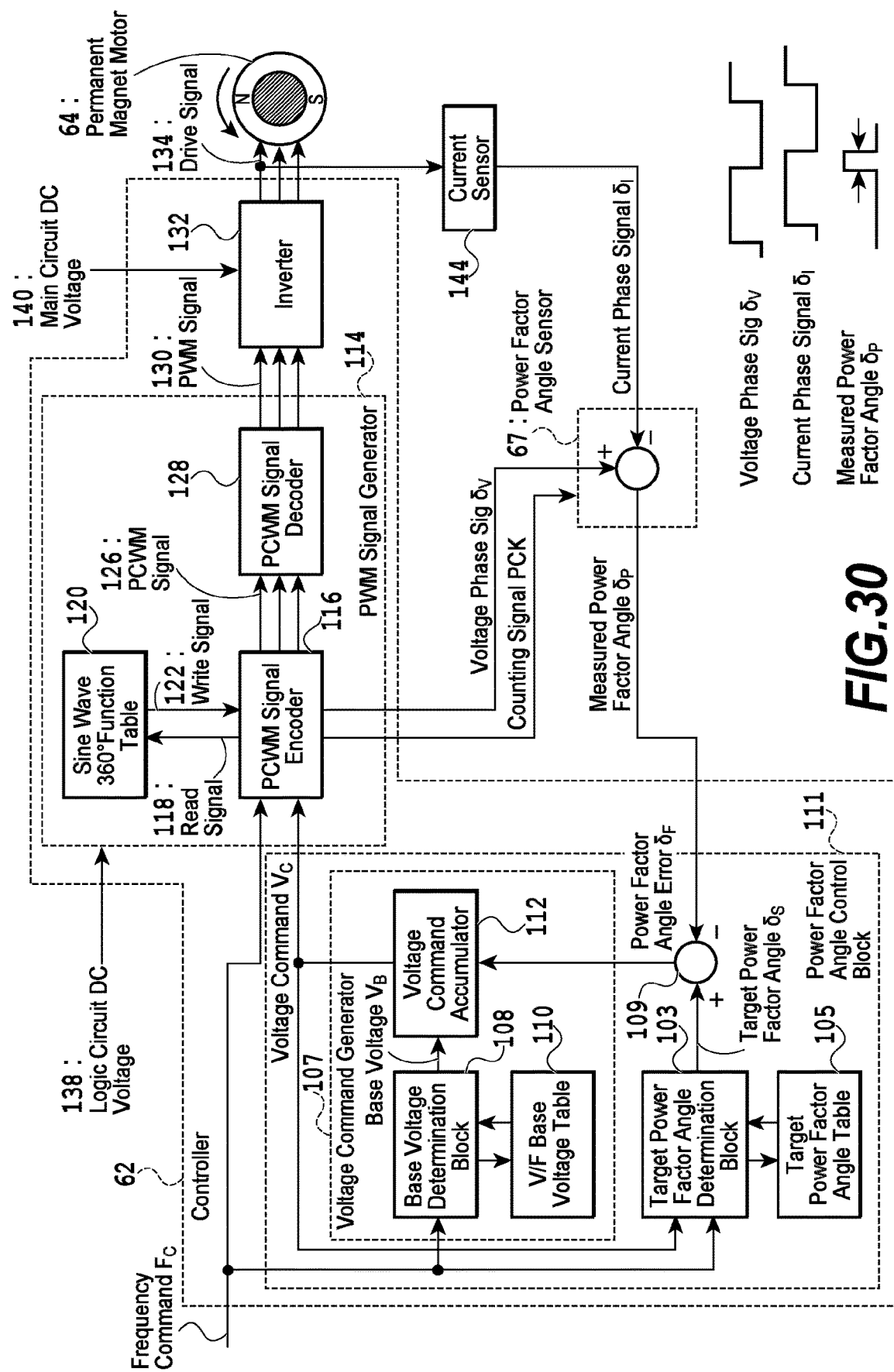
FIG. 30 is a detailed block diagram showing how a control system is mechanized using a power factor angle as the primary controlled variable according to another embodiment of the present disclosure.

As shown in FIG. 23, in use for a fan or a blower, a Hall sensor can be installed on the motor stator. However, for an air conditioner compressor application, the Hall sensor cannot be installed due to environmental restriction inside the compressor. Therefore, the current sensor shown in FIG. 30 is employed instead.

Next, by referring to FIG. 30 which shows one embodiment of power factor angle control, further detailed explanation will be given. FIG. 30 specifically shows the constitution of the permanent magnet motor drive system 60 of the present embodiment shown in FIG. 26.

In the present embodiment, the power factor angle sensor 67 and the power factor angle control block 111 perform the power factor angle measurement and control. However, as described previously, the power factor angle measurement and control are not always done during the entire motor drive. They are performed within certain motor speed ranges in which the motor enters into steady operation.

The power factor angle control block 111 generates the voltage command VC based on the frequency command FC and the measured power factor angle δP to control the power factor angle.

The frequency command FC supplied from the outside of FIG. 30, and the voltage command VC which is calculated on real time inside the figure and described later, are input to a target power factor angle determination block 103 inside the power factor angle control block 111. The target power factor angle determination block 103 determines the target power factor angle δS based on the frequency command FC and the voltage command VC by referring to the target power factor angle table 105. The target power factor angle table 105 is a set of values of power factor angles at which the efficiency becomes optimal, and which are obtained by conducting load test on the motor in advance. The target power factor angle table 105 is given in the format shown in FIG. 27 as described previously.

The power factor angle sensor 67 in FIG. 30 subtracts the current phase signal δI output from the current sensor 144, from the voltage phase signal δV output from the PCWM signal encoder 116, which is described later, to obtain the measured power factor angle δP as the output.

The power factor angle sensor 67 outputs the measured power factor angle δP of which measurement is made by the method described in FIGS. 28 and 29. That is, it subtracts the current phase signal (signal representing the phase of the terminal current) δI, from the voltage phase signal (signal representing the phase of the terminal voltage) δV, to obtain the output which is the measured power factor angle δP. The measured power factor angle δP is output to a power factor angle error calculator 109.

The power factor angle error calculator 109 subtracts the measured power factor angle δP from the target power factor angle δS to obtain a power factor angle error OF. The power factor angle error OF is input to a voltage command accumulator 112 inside a voltage command generator 107.

The voltage command generator 107 generates a voltage command VC. The voltage command generator 107 comprises a base voltage determination block 108, a V/F base voltage table 110, and the voltage command accumulator 112.

The frequency command FC is input to the base voltage determination block 108. The base voltage determination block 108 determines a base voltage VB by referring to the V/F base voltage table 110. The V/F base voltage table 110 is a one obtained by conducting a load test on the motor in advance, and given in the format shown in FIG. 25. The base voltage VB output from the base voltage determination block 108, is input to the voltage command accumulator 112 having an addition/subtraction/storage function.

At the time of entering into the power factor angle measurement and control loop, the voltage command accumulator 112 outputs the base voltage VB as the initial value of the voltage command VC, to the target power factor angle determination block 103 and the PCWM encoder 116. Thereafter, the voltage command accumulator 112 receives the power factor angle error OF from the power factor angle error calculator 109, and adjusts the voltage command VC based on the power factor angle error OF. Specifically, when the power factor angle error OF is plus, it means the voltage phase is delayed from the current phase beyond the target value, and the load is light. Therefore, it works so that the voltage command VC is decreased. Contrary, when the power factor angle error OF is minus, it means the voltage phase is advanced from the current phase beyond the target value, and the load is heavy. Therefore, it works so that the voltage command VC is increased.

On the other hand, at the time of exiting from the power factor angle measurement and control loop, the voltage command accumulator 112 continues to renew the value held by itself toward the value of the base voltage VB so that the held value matches the base voltage VB in the end.

A PWM signal generator 114 comprises the PCWM signal encoder 116, a PCWM signal decoder 128, and the sine wave 360° function table 120. For example, the PWM signal generator 114 can be realized as an LSI or an ASIC. A logic part DC voltage 138 is supplied to the PWM signal generator 114. The PWM signal generator 114 generates a PWM signal based on the frequency command FC and the voltage command VC.

Here, the PWM signal generator 114 can be configured similarly to the ASIC 06 shown in FIGS. 1 and 2. However, in the present embodiment, the clocks CK1, CK3, CK4 and CK5 shown in FIG. 2 are made eight times longer. Namely, CK1, CK3, CK4 and CK5 are made as 1.6 μs, 409.6 μs, 409.6 μs and 29.4912 ms, respectively. Further, until the machine frequency FM reaches the frequency command (command frequency) FC, the process shown in FIG. 6 is conducted, and the power factor angle control is not conducted. After the machine frequency FM reaches the frequency command (command frequency) FC, the voltage command VC is input as the machine voltage VM to the PCWM signal encoder 116, and power factor angle control is conducted.

The PCWM signal encoder 116 receives the frequency command FC and the voltage command VC as inputs, and receives data stored in the sine wave 360° function table 120 shown in FIG. 3 as a write signal 122 by a read signal 118 of a prescribed period. The PCWM signal encoder 116 outputs an encoded PCWM signal 126 by real time processing the write signal 122 and the information of the frequency command FC and the voltage command VC.

The format of the sine wave 360° function table 120 is the same as the unit sine function table in FIG. 3. The table consists of 720 8-bit binary signals. 720 is selected as a multiple of 6. In the present embodiment, a three phase permanent magnet type motor is used, and therefore it is preferable to select a multiple of 6.

A figure showing how the information of the sine wave 360° function table 120 is processed in the PCWM signal encoder 116, is the fractional sine function numeric nf representing the instantaneous amplitude value and the pulse width numeric pw of FIG. 4. It shows that after the inverter starts at the origin of the circle, the scanning speed increases with the operation point moving toward the outside as it is accelerated, and when it reaches the maximum speed, the operation point circulates on the outer periphery of the circle.

A figure showing how the fractional sine function numeric nf in FIG. 4 is converted to the pulse width numeric pw, is the relationship between the pulse width numeric pw and the fractional sine function numeric nf of FIG. 5. However, as described above, in the present embodiment, CK1 and CK3 are made as 1.6 μs and 409.6 μs, respectively.

As shown in the left side of FIG. 5, based on the calculation formula shown in FIG. 5, the encoded pulse width numeric pw in the unit PWM pulse interval is obtained, and this is output as the PCWM signal 126.

The PCWM signal decoder 128 decodes the PCWM signal 126 input from the PCWM signal encoder 116 on real time as a PWM signal 130, and outputs it to the next stage inverter (gate drive) 132. The decoding method of the PCWM signal decoder 128 is described previously with reference to FIGS. 10-14.

The inverter 132 generates a motor drive signal 134 based on the PWM signal 130. The inverter 132 can be configured similarly to the gate drive and power transistor circuitry 08 shown in FIGS. 1 and 2. The motor drive signal 134 output from the inverter 132 drives the three phase permanent magnet motor 64 which is directly coupled to the load 70. A main circuit DC voltage 140 is supplied to the inverter 132.

The controller 62 applies the voltage to the permanent magnet motor 64, and therefore it knows the state of the terminal voltage at each time. The PCWM signal encoder 116 of the controller 62 outputs, among its outputs, the voltage phase signal δV which is an on/off signal of 50% duty representing the sine wave signal magnitude (zero or more, or less than zero) of the terminal voltage.

In the case of FIG. 30, the current sensor 144 is installed on the inverter board of the controller 62, and is coupled to the drive signal 134 of the three phase permanent magnet motor 64 without contact by the Hall effect. The current sensor 144 converts the drive current (terminal current) signal of the three phase permanent magnet motor 64 to the current phase signal δI which is an on/off signal of 50% duty representing the magnitude (zero or more, or less than zero) of the signal by a comparator in the current sensor 144, and outputs the current phase signal δI.

The PCWM signal encoder 116 outputs the counting signal (read signal) PCK which becomes on/off at every occurrence of the write signal 122. The counting signal PCK outputs as many pulses as the number of data stored in the sine wave 360° function table 120 during one period of the drive frequency signal regardless of the magnitude of the drive frequency. This can be called the second carrier which is synchronized to the period of the drive frequency. When the phase difference between the voltage phase signal δV and the current phase signal δI is digitally measured, the phase difference becomes an effective means as an index showing the ratio to the wavelength of the drive frequency signal.

The power factor angle sensor 67 receives the voltage phase signal δV and the current phase signal δI as inputs, counts the phase difference between the two by the counting signal PCK, and outputs the resulting number of counts as the measured power factor angle δP.

In this way, it is possible to count digitally what percentage of the wavelength at the current drive frequency the magnitude of the power factor angle becomes. Namely, the inverter 132 of the controller 62 applies the sine wave voltage to the permanent magnet motor 64. Further, the phase of the voltage is expressed in n=720 ways (see FIGS. 3 and 4). Further, the PCWM signal encoder 116 of the controller 62 sends n=720 counting signals PCK (pulses) to the power factor angle sensor 67 during one period (one wavelength) of the voltage. Then, the power factor angle sensor 67 measures the power factor angle by measuring the number of pulses which corresponds to the phase difference between the terminal voltage and the terminal current corresponds to. Thus, the power factor angle sensor 67 can count digitally what percentage of the wavelength at the current drive frequency the magnitude of the power factor angle becomes.

In the present embodiment, the phase of the voltage is expressed in n=720 ways. However, another value (integer equal to or greater than 2) can be employed as n. Here, as the value of n, 6 or more is preferable. Specifically, a multiple of 6 which is 6 or more is preferable.

OTHERS

In the above-described embodiments, a permanent magnet motor (three phase permanent magnet motor) is used as a synchronous motor, but the present disclosure can be applied to other synchronous motors. Further, an outer rotor type motor is used as a motor, but the present disclosure can be applied to an inner rotor type motor.

Those having skill in this art will understand that many changes may be made to the details of the above-described embodiments without departing from the underlying principles of the present disclosure. Therefore, the scope of the present invention is determined only by the claims.

The invention claimed is:

1. A synchronous motor drive system comprising:
    a synchronous motor;
    a load angle sensor for measuring a load angle of the synchronous motor; and
    a controller for generating a drive signal based on an input frequency command and the measured load angle, and supplying the drive signal to the synchronous motor,
    wherein the synchronous motor is a permanent magnet motor,
    the permanent magnet motor comprises:
        a rotor comprising a permanent magnet; and
        a stator comprising an armature,
    the synchronous motor drive system further comprises a permanent magnet magnetic flux sensor for detecting a permanent magnet magnetic flux, and
    the load angle sensor measures a phase difference between an armature magnetic flux and the permanent magnet magnetic flux to measure the load angle.

2. The synchronous motor drive system as claimed in claim 1, wherein
    the controller sends an armature magnetic flux phase signal representing a phase of the armature magnetic flux to the load angle sensor,
    the permanent magnet magnetic flux sensor sends a permanent magnet magnetic flux phase signal representing a phase of the permanent magnet magnetic flux to the load angle sensor, and
    the load angle sensor measures the phase difference between the armature magnetic flux and the permanent magnet magnetic flux based on the armature magnetic flux phase signal and the permanent magnet magnetic flux phase signal.

3. The synchronous motor drive system as claimed in claim 2, wherein
    the controller sends, as the armature magnetic flux phase signal, an on/off signal representing a magnitude of the armature magnetic flux, and
    the permanent magnet magnetic flux sensor sends, as the permanent magnet magnetic flux phase signal, an on/off signal representing a magnitude of the permanent magnet magnetic flux.

4. The synchronous motor drive system as claimed in claim 1, wherein
    the controller applies a sine wave voltage to the permanent magnet motor, expresses a phase of the voltage inn ways (n is an integer equal to or greater than 2), and sends n pulses to the load angle sensor during one period of the voltage, and
    the load angle sensor measures the load angle by measuring the number of pulses which corresponds to phase difference between the armature magnetic flux and the permanent magnet magnetic flux.

5. The synchronous motor drive system as claimed in claim 1, wherein the permanent magnet magnetic flux sensor is a Hall sensor.

6. The synchronous motor drive system as claimed in claim 1, wherein
    the controller comprises:
        a load angle control block for generating a voltage command based on the frequency command and the measured load angle to control the load angle;
        a PWM signal generator for generating a PWM signal based on the frequency command and the voltage command; and
        an inverter for generating the drive signal based on the PWM signal.

7. The synchronous motor drive system as claimed in claim 6, wherein
    the load angle control block comprises:
        a voltage command generator for generating the voltage command;
        a target load angle table storing a target load angle to be targeted for a frequency and a voltage applied to the synchronous motor;
        a target load angle determination block for determining the target load angle based on the frequency command and the voltage command by referring to the target load angle table; and
        a load angle error calculator for calculating a load angle error between the target load angle and the measured load angle; and
    the voltage command generator adjusts the voltage command to be generated based on the load angle error.

8. A synchronous motor drive method for driving a synchronous motor, comprising:
    a step of receiving input of a frequency command;
    a load angle measurement step of measuring a load angle of the synchronous motor; and
    a step of generating a drive signal based on the frequency command and the measured load angle, and supplying the drive signal to the synchronous motor,
    wherein the synchronous motor is a permanent magnet motor,
    the permanent magnet motor comprises:
        a rotor comprising a permanent magnet; and
        a stator comprising an armature,
    the synchronous motor drive method further comprises a step of detecting a permanent magnet magnetic flux; and
    the load angle measurement step measures a phase difference between an armature magnetic flux and the permanent magnet magnetic flux to measure the load angle.

9. The synchronous motor drive method as claimed in claim 8, wherein the load angle measurement step defines an armature magnetic flux axis at a position which is delayed from an armature voltage axis by $\pi/2$ in electric angle, and measures a phase difference between the armature magnetic flux and the permanent magnet magnetic flux relative to the armature magnetic flux axis.

\* \* \* \* \*